US009517966B2

(12) United States Patent
Danielson et al.

(10) Patent No.: US 9,517,966 B2
(45) Date of Patent: *Dec. 13, 2016

(54) GLASS COMPOSITIONS WITH IMPROVED CHEMICAL AND MECHANICAL DURABILITY

(71) Applicant: Corning Incorporated, Corning, NY (US)

(72) Inventors: Paul Stephen Danielson, Dundee, NY (US); Steven Edward DeMartino, Painted Post, NY (US); Melinda Ann Drake, Corning, NY (US); Robert Michael Morena, Lindley, NY (US); Santona Pal, Painted Post, NY (US); Robert Anthony Schaut, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,722

(22) Filed: Oct. 22, 2014

(65) Prior Publication Data
US 2015/0037571 A1 Feb. 5, 2015

Related U.S. Application Data

(63) Continuation-in-part of application No. 13/660,450, filed on Oct. 25, 2012, now Pat. No. 8,980,777.

(60) Provisional application No. 61/551,163, filed on Oct. 25, 2011.

(51) Int. Cl.
*C03C 21/00* (2006.01)
*C03C 3/087* (2006.01)
*C03C 3/091* (2006.01)
*C03C 4/20* (2006.01)

(52) U.S. Cl.
CPC .............. *C03C 3/087* (2013.01); *C03C 3/091* (2013.01); *C03C 4/20* (2013.01); *C03C 21/002* (2013.01); *Y10T 428/131* (2015.01); *Y10T 428/1317* (2015.01); *Y10T 428/26* (2015.01); *Y10T 428/265* (2015.01); *Y10T 428/315* (2015.01)

(58) Field of Classification Search
CPC ........ C03C 21/00; C03C 21/002; C03C 3/087; C03C 3/091
See application file for complete search history.

(56) References Cited

U.S. PATENT DOCUMENTS

| 3,054,686 A | 9/1962 | Hagedorn |
| RE25,456 E | 10/1963 | Bacon et al. |
| 3,351,474 A | 11/1967 | Hagedorn et al. |
| 3,490,885 A | 1/1970 | Hammer |
| 3,772,135 A | 11/1973 | Hara et al. |
| 3,844,754 A | 10/1974 | Grubb et al. |
| 3,900,329 A | 8/1975 | Grubb et al. |
| 4,065,317 A | 12/1977 | Baak et al. |
| 4,161,556 A | 7/1979 | Lenard et al. |
| 4,312,953 A | 1/1982 | Mills et al. |
| 4,689,085 A | 8/1987 | Plueddemann |
| 5,114,757 A | 5/1992 | Linde et al. |
| 5,286,527 A | 2/1994 | Blum et al. |
| 5,721,181 A | 2/1998 | Sehgal et al. |
| 5,736,476 A | 4/1998 | Watzke et al. |
| 5,854,153 A | 12/1998 | Kohli |
| 6,096,432 A | 8/2000 | Sakaguchi et al. |
| 6,156,399 A | 12/2000 | Spallek et al. |
| 6,214,429 B1 | 4/2001 | Zou et al. |
| 6,333,285 B1 | 12/2001 | Chopinet et al. |
| 6,472,068 B1 | 10/2002 | Glass et al. |
| 6,518,211 B1 | 2/2003 | Bradshaw et al. |
| 6,561,275 B2 | 5/2003 | Glass et al. |
| 6,599,594 B1 | 7/2003 | Walther et al. |
| 6,630,420 B1 | 10/2003 | Naumann et al. |
| 6,794,323 B2 | 9/2004 | Peuchert et al. |
| 6,818,576 B2 | 11/2004 | Ikenishi et al. |

(Continued)

FOREIGN PATENT DOCUMENTS

CN 101717189 A 6/2010
DE 29702816 U1 4/1997

(Continued)

OTHER PUBLICATIONS

Non-Final Office Action dated Dec. 3, 2014 relating to U.S. Appl. No. 13/660,141, filed Oct. 25, 2012. pp. 1-13.
Non-Final Office Action dated Jun. 16, 2015 relating to U.S. Appl. No. 14/701,185, filed Apr. 30, 2015. pp. 1-16.
Non-Final Office Action dated Jun. 10, 2015 relating to U.S. Appl. No. 14/272,189, filed May 7, 2014. pp. 1-22.
Non-Final Office Action dated Jun. 18, 2015 relating to U.S. Appl. No. 14/551,773, filed Nov. 24, 2014. pp. 1-15.

(Continued)

*Primary Examiner* — Elizabeth A Bolden
(74) *Attorney, Agent, or Firm* — Dinsmore & Shohl LLP

(57) ABSTRACT

The embodiments described herein relate to chemically and mechanically durable glass compositions and glass articles formed from the same. In another embodiment, a glass composition may include from about 70 mol. % to about 80 mol. % $SiO_2$; from about 3 mol. % to about 13 mol. % alkaline earth oxide; X mol. % $Al_2O_3$; and Y mol. % alkali oxide. The alkali oxide may include $Na_2O$ in an amount greater than about 8 mol. %. A ratio of Y:X may be greater than 1 and the glass composition may be free of boron and compounds of boron. In some embodiments, the glass composition may also be free of phosphorous and compounds of phosphorous. Glass articles formed from the glass composition may have at least a class S3 acid resistance according to DIN 12116, at least a class A2 base resistance according to ISO 695, and a type HGA1 hydrolytic resistance according to ISO 720.

19 Claims, 6 Drawing Sheets

(56) References Cited

U.S. PATENT DOCUMENTS

| | | | |
|---|---|---|---|
| 6,939,819 | B2 | 9/2005 | Usui et al. |
| 7,087,307 | B2 | 8/2006 | Nagashima et al. |
| 7,315,125 | B2 | 1/2008 | Kass |
| 7,470,999 | B2 | 12/2008 | Saito et al. |
| 8,367,208 | B2 | 2/2013 | Glaesemann et al. |
| 8,518,545 | B2 | 8/2013 | Akiba et al. |
| 8,551,898 | B2 | 10/2013 | Danielson et al. |
| 8,753,994 | B2 | 6/2014 | Danielson et al. |
| 8,756,994 | B2* | 6/2014 | Yoneda ............. G01C 19/5755 73/504.12 |
| 8,778,820 | B2 | 7/2014 | Gomez et al. |
| 8,980,777 | B2* | 3/2015 | Danielson ............... C03C 3/087 428/34.4 |
| 9,012,343 | B2 | 4/2015 | Yamamoto et al. |
| 2004/0096588 | A1 | 5/2004 | Brandt |
| 2007/0004580 | A1 | 1/2007 | Kass |
| 2007/0123410 | A1 | 5/2007 | Morena et al. |
| 2007/0157919 | A1 | 7/2007 | Marandon |
| 2007/0191207 | A1 | 8/2007 | Danielson et al. |
| 2007/0293388 | A1 | 12/2007 | Zuyev et al. |
| 2008/0281260 | A1 | 11/2008 | William et al. |
| 2009/0163342 | A1 | 6/2009 | Kolberg et al. |
| 2009/0197088 | A1 | 8/2009 | Murata |
| 2009/0275462 | A1 | 11/2009 | Murata |
| 2009/0325776 | A1 | 12/2009 | Murata |
| 2010/0035745 | A1 | 2/2010 | Murata |
| 2010/0047521 | A1 | 2/2010 | Amin et al. |
| 2010/0120603 | A1 | 5/2010 | Morena et al. |
| 2010/0317506 | A1 | 12/2010 | Fechner et al. |
| 2011/0014475 | A1 | 1/2011 | Murata |
| 2011/0017297 | A1 | 1/2011 | Aitken et al. |
| 2011/0045960 | A1 | 2/2011 | Fechner et al. |
| 2011/0045961 | A1 | 2/2011 | Dejneka et al. |
| 2011/0062619 | A1 | 3/2011 | Laine et al. |
| 2011/0071012 | A1 | 3/2011 | Kondo et al. |
| 2011/0091704 | A1 | 4/2011 | Akiba et al. |
| 2011/0098172 | A1 | 4/2011 | Brix |
| 2011/0123832 | A1 | 5/2011 | Matsumoto et al. |
| 2011/0135938 | A1 | 6/2011 | Kim et al. |
| 2011/0159318 | A1 | 6/2011 | Endo et al. |
| 2011/0177987 | A1 | 7/2011 | Lenting et al. |
| 2011/0226658 | A1 | 9/2011 | Tata-Venkata et al. |
| 2011/0274916 | A1 | 11/2011 | Murata |
| 2012/0100329 | A1 | 4/2012 | Baratta |
| 2012/0135226 | A1 | 5/2012 | Bookbinder et al. |
| 2012/0135853 | A1 | 5/2012 | Amin et al. |
| 2012/0148770 | A1 | 6/2012 | Rong et al. |
| 2012/0183812 | A1 | 7/2012 | Kajita |
| 2012/0199203 | A1 | 8/2012 | Nishizawa et al. |
| 2012/0208309 | A1 | 8/2012 | Tsujimura et al. |
| 2012/0234368 | A1 | 9/2012 | Cintora et al. |
| 2012/0277085 | A1 | 11/2012 | Bookbinder et al. |
| 2012/0297829 | A1 | 11/2012 | Endo et al. |
| 2013/0004758 | A1 | 1/2013 | Dejneka et al. |
| 2013/0011650 | A1 | 1/2013 | Akiba et al. |
| 2013/0045375 | A1 | 2/2013 | Gross |
| 2013/0101596 | A1 | 4/2013 | DeMartino et al. |
| 2013/0101764 | A1 | 4/2013 | Schaut et al. |
| 2013/0101766 | A1 | 4/2013 | Danielson et al. |
| 2013/0101853 | A1 | 4/2013 | Drake et al. |
| 2013/0122284 | A1 | 5/2013 | Gross |
| 2013/0196094 | A1 | 8/2013 | Weeks et al. |
| 2013/0196095 | A1 | 8/2013 | Weeks et al. |
| 2013/0196096 | A1 | 8/2013 | Weeks et al. |
| 2013/0196097 | A1 | 8/2013 | Weeks et al. |
| 2013/0202823 | A1 | 8/2013 | Weeks et al. |
| 2013/0213848 | A1 | 8/2013 | Weeks et al. |
| 2013/0216742 | A1 | 8/2013 | DeMartino et al. |
| 2014/0023865 | A1 | 1/2014 | Comte et al. |
| 2014/0154440 | A1* | 6/2014 | Iida .................. C03C 3/085 428/34.4 |
| 2015/0079318 | A1 | 3/2015 | Danielson et al. |
| 2015/0157533 | A1 | 6/2015 | DeMartino et al. |
| 2015/0232374 | A1* | 8/2015 | Danielson ............... C03C 4/20 428/410 |

FOREIGN PATENT DOCUMENTS

| | | | |
|---|---|---|---|
| DE | 102004011009 | A1 | 9/2005 |
| EP | 1074521 | A3 | 11/2001 |
| EP | 2540682 | A1 | 1/2013 |
| GB | 966731 | A | 8/1964 |
| GB | 1334828 | A | 10/1973 |
| GB | 2335423 | A | 9/1999 |
| IN | 231117 | | 3/2009 |
| JP | H04-219343 | A | 8/1992 |
| JP | 7223845 | A | 8/1995 |
| JP | H09-124338 | | 5/1997 |
| JP | H09-124339 | | 5/1997 |
| JP | H09-241033 | | 9/1997 |
| JP | 11314931 | A | 11/1999 |
| JP | 2000007372 | A | 1/2000 |
| JP | 2002025762 | A | 1/2001 |
| JP | 2001180969 | A | 7/2001 |
| JP | 2001192239 | A | 7/2001 |
| JP | 2001229526 | A | 8/2001 |
| JP | 2001236634 | A | 8/2001 |
| JP | 2002003241 | A | 1/2002 |
| JP | 2002249340 | A | 9/2002 |
| JP | 2004067443 | A | 3/2004 |
| JP | 2004131314 | A | 4/2004 |
| JP | 2008195602 | A | 8/2008 |
| JP | 2010059038 | A | 3/2010 |
| JP | 2010202413 | A | 9/2010 |
| JP | 2012184118 | A | 9/2012 |
| JP | WO 2013021975 | A1* | 2/2013 ............. C03C 3/085 |
| KR | 630309 | A | 5/2006 |
| RO | 83460 | | 3/1984 |
| SU | 990700 | A1 | 1/1983 |
| WO | 9624559 | A1 | 8/1996 |
| WO | 9725932 | A1 | 7/1997 |
| WO | 9905070 | A1 | 2/1999 |
| WO | 2007025932 | A2 | 3/2007 |
| WO | 2008050500 | A1 | 5/2008 |
| WO | 2008143999 | A1 | 11/2008 |
| WO | 2009002660 | A2 | 12/2008 |
| WO | 2010084670 | A1 | 7/2010 |
| WO | 2011007785 | A1 | 1/2011 |
| WO | 2011049146 | A1 | 4/2011 |
| WO | 2011069338 | A1 | 6/2011 |
| WO | 2011103798 | A1 | 9/2011 |
| WO | 2011103799 | A1 | 9/2011 |
| WO | 2011145661 | A1 | 11/2011 |
| WO | 2012026290 | A1 | 3/2012 |
| WO | 2012124757 | A1 | 9/2012 |

OTHER PUBLICATIONS

International Search Report & Written Opinion mailed Jan. 30, 2013 for International Patent Application No. PCT/US2012/061939 filed Oct. 25, 2012. pp. 1-14.

International Search Report & Written Opinion mailed Jan. 30, 2013 for International Patent Application No. PCT/US2012/061867 filed Oct. 25, 2012. pp. 1-16.

Non-Final Office Action mailed Mar. 14, 2013, relating to U.S. Appl. No. 13/660,394, filed Oct. 25, 2012. pp. 1-7.

Notice of Allowance mailed Jun. 27, 2013, relating to U.S. Appl. No. 13/660,394, filed Oct. 25, 2012. pp. 1-7.

Corrected Notice of Allowance mailed Sep. 11, 2013, relating to U.S. Appl. No. 13/660,394, filed Oct. 25, 2012. pp. 1-2.

Non-Final Office Action mailed Nov. 4, 2013, relating to U.S. Appl. No. 14/011,376, filed Aug. 27, 2013. pp. 1-11.

International Search Report & Written Opinion relating to PCT/US2013/048589 filed Jun. 28, 2013; Mail Date: Oct. 28, 2013. pp. 1-15.

Notice of Allowance mailed Mar. 11, 2014 relating to U.S. Appl. No. 14/011,376, filed Aug. 27, 2013; pp. 1-11.

Non-Final Office Action mailed May 15, 2014, relating to U.S. Appl. No. 13/660,683, filed Oct. 25, 2012. pp. 1-12.

Non-Final Office Action dated Sep. 9, 2014 relating to U.S. Appl. No. 14/057,697, filed Oct. 18, 2013. pp. 1-15.

(56) References Cited

OTHER PUBLICATIONS

Non-Final Office Action dated Mar. 20, 2014 relating to U.S. Appl. No. 14/057,697, filed Oct. 18, 2013. pp. 1-14.
U.S. Pharmacopeial Convention Medicines Compendium, "<660> Containers-Glass" [online], (2014). Retrieved from the Internet: <URL: https://mc.usp.org/general-chapters>. pp. 1-5.
European Pharmacopeia, 5th edition, 3.2 Containers, [online]. Retrieved from the Internet: <URL: http://pharmacyebooks.com/2009/09/european-pharmacopoeia-5-0-online.html>. pp. 1-4.
Ciullo, P.A., Industrial Minerals and Their Uses—A Handbook and Formulary. William Andrew Publishing/Noyes, (1996). ISBN: 0-8155-1408-5. Online version available at: <URL: http://app.knovel.com/hotlink/toc/id:kpIMTUAHFB/industrial-minerals-their/industrial-minerals-their>. pp. 1-7.
Non-Final Office Action dated Jul. 15, 2014 relating to U.S. Appl. No. 13/660,450, filed Oct. 25, 2012. Pages 1-14.
Notice of Allowance mailed Nov. 12, 2014, relating to U.S. Appl. No. 13/660,450, filed Oct. 25, 2012. pp. 1-9.
European Communication pursuant to Article 94(3) EPC dated Feb. 4, 2016 for EP Patent Application No. 12781017.4. pp. 1-4.
Singapore Search Report & Written Opinion dated Jan. 12, 2016 for SG Patent Application No. 11201408732U. pp. 1-9.
Japanese 1st Office Action dated Jan. 26, 2016 for JP Patent Application No. 2014-538997. pp. 1-8.
Varshneya, A.K., "Chemical Strengthening of Glass: Lessons Learned and yet to be Learned," International Journal of Applied Glass Science, vol. 1 (2), p. 131-142 (2010).
Japanese 1st Office Action dated Aug. 9, 2016 for JP Patent Application No. 2016-124363. pp. 1-4.
Japanese 1st Office Action dated Aug. 9, 2016 for JP Patent Application No. 2016-124365. pp. 1-7.

\* cited by examiner

GLASS COMPOSITIONS WITH IMPROVED CHEMICAL AND MECHANICAL DURABILITY

CROSS REFERENCE TO RELATED APPLICATIONS

The present application claims priority to and is a continuation-in-part of U.S. Non-provisional application Ser. No. 13/660,450, filed Oct. 25, 2012 and entitled "Glass Compositions With Improved Chemical and Mechanical Durability" which claims priority to U.S. Provisional Patent Application Ser. No. 61/551,163, filed Oct. 25, 2011 and entitled "Glass Compositions With Improved Chemical and Mechanical Durability" each of which are incorporated by reference herein.

BACKGROUND

Field

The present specification generally relates to glass compositions and, more specifically, to chemically and mechanically durable glass compositions which are suitable for use in pharmaceutical packaging.

Technical Background

Historically, glass has been used as the preferred material for packaging pharmaceuticals because of its hermeticity, optical clarity and excellent chemical durability relative to other materials. Specifically, the glass used in pharmaceutical packaging must have adequate chemical durability so as not to affect the stability of the pharmaceutical compositions contained therein. Glasses having suitable chemical durability include those glass compositions within the ASTM standard 'Type 1B' glass compositions which have a proven history of chemical durability.

However, use of glass for such applications is limited by the mechanical performance of the glass. Specifically, in the pharmaceutical industry, glass breakage is a safety concern for the end user as the broken package and/or the contents of the package may injure the end user. Breakage can be costly to pharmaceutical manufacturers because breakage within a filling line requires that neighboring unbroken containers be discarded as the containers may contain fragments from the broken container. Breakage may also require that the filling line be slowed or stopped, lowering production yields. In addition, breakage may also result in the loss of active drug product leading to increased costs. Further, non-catastrophic breakage (i.e., when the glass cracks but does not break) may cause the contents to lose their sterility which, in turn, may result in costly product recalls.

One approach to improving the mechanical durability of the glass package is to thermally temper the glass package. Thermal tempering strengthens glass by inducing a surface compressive stress during rapid cooling after forming. This technique works well for glass articles with flat geometries (such as windows), glass articles with thicknesses>2 mm, and glass compositions with high thermal expansion. However, pharmaceutical glass packages typically have complex geometries (vial, tubular, ampoule, etc.), thin walls (~1-1.5 mm), and are produced from low expansion glasses (30-55× $10^{-7} K^{-1}$) making glass pharmaceutical packages unsuitable for strengthening by thermal tempering.

Chemical tempering also strengthens glass by the introduction of surface compressive stress. The stress is introduced by submerging the article in a molten salt bath. As ions from the glass are replaced by larger ions from the molten salt, a compressive stress is induced in the surface of the glass. The advantage of chemical tempering is that it can be used on complex geometries, thin samples, and is relatively insensitive to the thermal expansion characteristics of the glass substrate. However, glass compositions which exhibit a moderate susceptibility to chemical tempering generally exhibit poor chemical durability and vice-versa.

Accordingly, a need exists for glass compositions which are chemically durable and susceptible to chemical strengthening by ion exchange for use in glass pharmaceutical packages, and similar applications.

SUMMARY

According to one embodiment, a glass article may be formed from a glass composition which may include: $SiO_2$ in an amount greater than about 70 mol. % and less than or equal to about 80 mol. %; from about 3 mol. % to about 13 mol. % alkaline earth oxide, the alkaline earth oxide comprising CaO; X mol. % $Al_2O_3$; and Y mol. % alkali oxide, wherein the alkali oxide comprises $Na_2O$ in an amount greater than or equal to about 9 mol. % and less than or equal to about 13 mol. %. The ratio of a concentration of $B_2O_3$ (mol. %) in the glass composition to (Y mol. %-X mol. %) may be less than 0.3. A ratio of Y:X in the glass composition may be greater than 1 and less than or equal to 2. The glass article may have a compressive stress layer extending from a surface of the glass article to a depth of greater than or equal to about 10 microns with a surface compressive stress of greater than or equal to about 250 MPa. The glass article may have a Vickers crack initiation threshold of at least about 7 kgf.

According to another embodiment, a glass article may be formed from a glass composition which may include from about 70 mol. % to about 80 mol. % $SiO_2$; from about 4 mol. % to about 8 mol. % alkaline earth oxide, the alkaline earth oxide comprising CaO; X mol. % $Al_2O_3$, wherein X is greater than or equal to about 5 and less than or equal to about 7; and Y mol. % alkali oxide, wherein the alkali oxide comprises $Na_2O$ in an amount greater than about 8 mol. %, and the glass composition is free of boron and compounds of boron. The glass article may have a compressive stress layer extending from a surface of the glass article to a depth of greater than or equal to about 10 microns with a surface compressive stress of greater than or equal to about 250 MPa. The glass article may also have a Vickers crack initiation threshold of at least about 7 kgf.

According to another embodiment, a glass article may be formed from a glass composition which may include greater than or equal to about 68 mol. % $SiO_2$ and less than or equal to about 80 mol. % $SiO_2$; greater than or equal to about 3 mol. % and less than or equal to about 13 mol. % alkaline earth oxide; X mol. % $Al_2O_3$, wherein X is greater than or equal to about 4 and less than or equal to about 8; Y mol. % alkali oxide, wherein the alkali oxide comprises $Na_2O$ in an amount greater than about 8 mol %; and $B_2O_3$, wherein a ratio ($B_2O_3$ (mol. %)/(Y mol. %-X mol. %) is greater than 0 and less than 0.3. The glass article may have a compressive stress layer extending from a surface of the glass article to a depth of greater than or equal to about 10 microns with a surface compressive stress of greater than or equal to about 250 MPa. The glass article has a Vickers crack initiation threshold of at least about 7 kgf.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
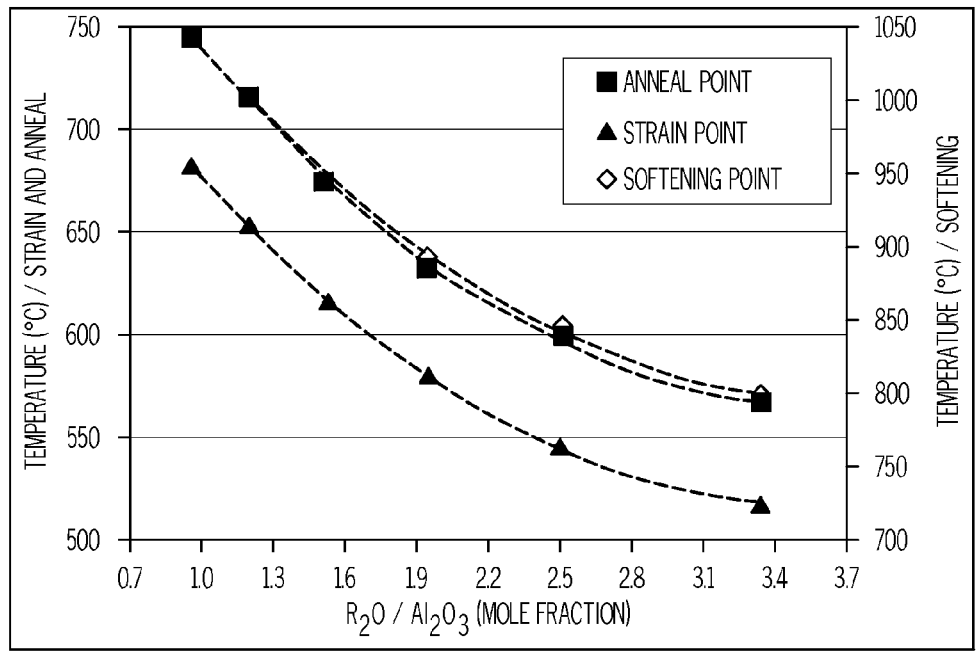
FIG. 1 graphically depicts the relationship between the ratio of alkali oxides to alumina (x-axis) and the strain point, annealing point, and softening point (y-axes) of inventive and comparative glass compositions.

Reference will now be made in detail to various embodiments of glass compositions which exhibit improved chemical and mechanical durability. Such glass compositions are suitable for use in various applications including, without limitation, as pharmaceutical packaging materials. The glass compositions may also be chemically strengthened thereby imparting increased mechanical durability to the glass. The glass compositions described herein may generally comprise silica ($SiO_2$), alumina ($Al_2O_3$), alkaline earth oxides (such as MgO and/or CaO), and alkali oxides (such as $Na_2O$ and/or $K_2O$) in amounts which impart chemical durability to the glass composition. Moreover, the alkali oxides present in the glass compositions facilitate chemically strengthening the glass compositions by ion exchange. Various embodiments of the glass compositions will be described herein and further illustrated with reference to specific examples.

The term "softening point," as used herein, refers to the temperature at which the viscosity of the glass composition is $1 \times 10^{7.6}$ poise.

The term "annealing point," as used herein, refers to the temperature at which the viscosity of the glass composition is $1 \times 10^{13}$ poise.

The terms "strain point" and "$T_{strain}$" as used herein, refers to the temperature at which the viscosity of the glass composition is $3 \times 10^{14}$ poise.

The term "CTE," as used herein, refers to the coefficient of thermal expansion of the glass composition over a temperature range from about room temperature (RT) to about 300° C.

In the embodiments of the glass compositions described herein, the concentrations of constituent components (e.g., $SiO_2$, $Al_2O_3$, and the like) are specified in mole percent (mol. %) on an oxide basis, unless otherwise specified.

The terms "free" and "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.01 mol. %.

The term "chemical durability," as used herein, refers to the ability of the glass composition to resist degradation upon exposure to specified chemical conditions. Specifically, the chemical durability of the glass compositions described herein was assessed according to three established material testing standards: DIN 12116 dated March 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; and ISO 720: 1985 entitled "Glass—Hydrolytic resistance of glass grains at 121 degrees C.—Method of test and classification." The chemical durability of the glass may also be assessed according to ISO 719:1985 "Glass—Hydrolytic resistance of glass grains at 98 degrees C.—Method of test and classification," in addition to the above referenced standards. The ISO 719 standard is a less rigorous version of the ISO 720 standard and, as such, it is believed that a glass which meets a specified classification of the ISO 720 standard will also meet the corresponding classification of the ISO 719 standard. The classifications associated with each standard are described in further detail herein.

The glass compositions described herein are alkali aluminosilicate glass compositions which may generally include a combination of $SiO_2$ and one or more alkali oxides, such as $Na_2O$ and/or $K_2O$. The glass composition may also include $Al_2O_3$ and at least one alkaline earth oxide. In some embodiments, the glass compositions may be free from boron and compounds containing boron. The glass compositions are resistant to chemical degradation and are also suitable for chemical strengthening by ion exchange. In some embodiments the glass compositions may further comprise minor amounts of one or more additional oxides such as, for example, $SnO_2$, $ZrO_2$, ZnO, $TiO_2$, $As_2O_3$ or the like. These components may be added as fining agents and/or to further enhance the chemical durability of the glass composition.

In the embodiments of the glass compositions described herein $SiO_2$ is the largest constituent of the composition and, as such, is the primary constituent of the resulting glass network. $SiO_2$ enhances the chemical durability of the glass and, in particular, the resistance of the glass composition to decomposition in acid and the resistance of the glass composition to decomposition in water. Accordingly, a high $SiO_2$ concentration is generally desired. However, if the content of $SiO_2$ is too high, the formability of the glass may be diminished as higher concentrations of $SiO_2$ increase the difficulty of melting the glass which, in turn, adversely impacts the formability of the glass. In the embodiments described herein, the glass composition generally comprises $SiO_2$ in an amount greater than or equal to 67 mol. % and less than or equal to about 80 mol. % or even less than or equal to 78 mol. %. In some embodiments, the amount of $SiO_2$ in the glass composition may be greater than about 68 mol. %, greater than about 69 mol. % or even greater than about 70 mol. %. In some other embodiments, the amount of $SiO_2$ in the glass composition may be greater than 72 mol. %, greater than 73 mol. % or even greater than 74 mol. %. For example, in some embodiments, the glass composition may include from about 68 mol. % to about 80 mol. % or even to about 78 mol. % $SiO_2$. In some other embodiments the glass composition may include from about 69 mol. % to about 80 mol. % or even to about 78 mol. % $SiO_2$. In some other embodiments the glass composition may include from about 70 mol. % to about 80 mol. % or even to about 78 mol. % $SiO_2$. In still other embodiments, the glass composition comprises $SiO_2$ in an amount greater than or equal to 70 mol. % and less than or equal to 78 mol. %. In some embodiments, $SiO_2$ may be present in the glass composition in an amount from about 72 mol. % to about 78 mol. %. In some other embodiments, $SiO_2$ may be present in the glass composition in an amount from about 73 mol. % to about 78 mol. %. In other embodiments, $SiO_2$ may be present in the glass composition in an amount from about 74 mol. % to about 78 mol. %. In still other embodiments, $SiO_2$ may be present in the glass composition in an amount from about 70 mol. % to about 76 mol. %.

The glass compositions described herein may further include $Al_2O_3$. $Al_2O_3$, in conjunction with alkali oxides present in the glass compositions such as $Na_2O$ or the like, improves the susceptibility of the glass to ion exchange strengthening. In the embodiments described herein, $Al_2O_3$ is present in the glass compositions in X mol. % while the alkali oxides are present in the glass composition in Y mol. %. The ratio Y:X in the glass compositions described herein is greater than 1 in order to facilitate the aforementioned susceptibility to ion exchange strengthening. Specifically, the diffusion coefficient or diffusivity D of the glass composition relates to the rate at which alkali ions penetrate into the glass surface during ion exchange. Glasses which have a ratio Y:X greater than about 0.9 or even greater than about 1 have a greater diffusivity than glasses which have a ratio Y:X less than 0.9. Glasses in which the alkali ions have a greater diffusivity can obtain a greater depth of layer for a given ion exchange time and ion exchange temperature than glasses in which the alkali ions have a lower diffusivity. Moreover, as the ratio of Y:X increases, the strain point, anneal point, and softening point of the glass decrease, such that the glass is more readily formable. In addition, for a given ion exchange time and ion exchange temperature, it has been found that compressive stresses induced in glasses which have a ratio Y:X greater than about 0.9 and less than or equal to 2 are generally greater than those generated in glasses in which the ratio Y:X is less than 0.9 or greater than 2. Accordingly, in some embodiments, the ratio of Y:X is greater than 0.9 or even greater than 1. In some embodiments, the ratio of Y:X is greater than 0.9, or even greater than 1, and less than or equal to about 2. In still other embodiments, the ratio of Y:X may be greater than or equal to about 1.3 and less than or equal to about 2.0 in order to maximize the amount of compressive stress induced in the glass for a specified ion exchange time and a specified ion exchange temperature.

However, if the amount of $Al_2O_3$ in the glass composition is too high, the resistance of the glass composition to acid attack is diminished. Accordingly, the glass compositions described herein generally include $Al_2O_3$ in an amount greater than or equal to about 2 mol. % and less than or equal to about 10 mol. %. In some embodiments, the amount of $Al_2O_3$ in the glass composition is greater than or equal to about 4 mol. % and less than or equal to about 8 mol. %. In some other embodiments, the amount of $Al_2O_3$ in the glass composition is greater than or equal to about 5 mol. % to less than or equal to about 7 mol. %. In some other embodiments, the amount of $Al_2O_3$ in the glass composition is greater than or equal to about 6 mol. % to less than or equal to about 8 mol. %. In still other embodiments, the amount of $Al_2O_3$ in the glass composition is greater than or equal to about 5 mol. % to less than or equal to about 6 mol. %.

The glass compositions also include one or more alkali oxides such as $Na_2O$ and/or $K_2O$. The alkali oxides facilitate the ion exchangeability of the glass composition and, as such, facilitate chemically strengthening the glass. The alkali oxide may include one or more of $Na_2O$ and $K_2O$. The alkali oxides are generally present in the glass composition in a total concentration of Y mol. %. In some embodiments described herein, Y may be greater than about 2 mol. % and less than or equal to about 18 mol. %. In some other embodiments, Y may be greater than about 8 mol. %, greater than about 9 mol. %, greater than about 10 mol. % or even greater than about 11 mol. %. For example, in some embodiments described herein Y is greater than or equal to about 8 mol. % and less than or equal to about 18 mol. %. In still other embodiments, Y may be greater than or equal to about 9 mol. % and less than or equal to about 14 mol. %.

The ion exchangeability of the glass composition is primarily imparted to the glass composition by the amount of the alkali oxide $Na_2O$ initially present in the glass composition prior to ion exchange. Accordingly, in the embodiments of the glass compositions described herein, the alkali oxide present in the glass composition includes at least $Na_2O$. Specifically, in order to achieve the desired compressive strength and depth of layer in the glass composition upon ion exchange strengthening, the glass compositions include $Na_2O$ in an amount from about 2 mol. % to about 15 mol. % based on the molecular weight of the glass composition. In some embodiments the glass composition includes at least about 8 mol. % of $Na_2O$ based on the molecular weight of the glass composition. For example, the concentration of $Na_2O$ may be greater than 9 mol. %, greater than 10 mol. % or even greater than 11 mol. %. In some embodiments, the concentration of $Na_2O$ may be greater than or equal to 9 mol. % or even greater than or equal to 10 mol. %. For example, in some embodiments the glass composition may include $Na_2O$ in an amount greater than or equal to about 9 mol. % and less than or equal to about 15 mol. % or even greater than or equal to about 9 mol. % and less than or equal to 13 mol. %.

As noted above, the alkali oxide in the glass composition may further include $K_2O$. The amount of $K_2O$ present in the glass composition also relates to the ion exchangeability of the glass composition. Specifically, as the amount of $K_2O$ present in the glass composition increases, the compressive stress obtainable through ion exchange decreases as a result of the exchange of potassium and sodium ions. Accordingly, it is desirable to limit the amount of $K_2O$ present in the glass composition. In some embodiments, the amount of $K_2O$ is greater than or equal to 0 mol. % and less than or equal to 3 mol. %. In some embodiments, the amount of $K_2O$ is less or equal to 2 mol. % or even less than or equal to 1.0 mol. %. In embodiments where the glass composition includes $K_2O$, the $K_2O$ may be present in a concentration greater than or equal to about 0.01 mol. % and less than or equal to about 3.0 mol. % or even greater than or equal to about 0.01 mol. % and less than or equal to about 2.0 mol. %. In some embodiments, the amount of $K_2O$ present in the glass composition is greater than or equal to about 0.01 mol. % and less than or equal to about 1.0 mol. %. Accordingly, it should be understood that $K_2O$ need not be present in the glass composition. However, when $K_2O$ is included in the glass composition, the amount of $K_2O$ is generally less than about 3 mol. % based on the molecular weight of the glass composition.

Alkaline earth oxides may be present in the composition to improve the meltability of the glass batch materials and increase the chemical durability of the glass composition. In the glass compositions described herein, the total mol. % of alkaline earth oxides present in the glass compositions is generally less than the total mol. % of alkali oxides present in the glass compositions in order to improve the ion exchangeability of the glass composition. In the embodiments described herein, the glass compositions generally include from about 3 mol. % to about 13 mol. % of alkaline earth oxide. In some of these embodiments, the amount of alkaline earth oxide in the glass composition may be from about 4 mol. % to about 8 mol. % or even from about 4 mol. % to about 7 mol. %.

The alkaline earth oxide in the glass composition may include MgO, CaO, SrO, BaO or combinations thereof. In some embodiments, the alkaline earth oxide includes MgO, CaO or combinations thereof. For example, in the embodiments described herein the alkaline earth oxide includes MgO. MgO is present in the glass composition in an amount which is greater than or equal to about 3 mol. % and less than or equal to about 8 mol. % MgO. In some embodiments, MgO may be present in the glass composition in an amount which is greater than or equal to about 3 mol. % and less than or equal to about 7 mol. % or even greater than or equal to 4 mol. % and less than or equal to about 7 mol. % by molecular weight of the glass composition.

In some embodiments, the alkaline earth oxide may further include CaO. In these embodiments CaO is present in the glass composition in an amount from about 0 mol. % to less than or equal to 6 mol. % by molecular weight of the glass composition. For example, the amount of CaO present in the glass composition may be less than or equal to 5 mol. %, less than or equal to 4 mol. %, less than or equal to 3 mol. %, or even less than or equal to 2 mol. %. In some of these embodiments, CaO may be present in the glass composition in an amount greater than or equal to about 0.1 mol. % and less than or equal to about 1.0 mol. %. For example, CaO may be present in the glass composition in an amount greater than or equal to about 0.2 mol. % and less than or equal to about 0.7 mol. % or even in an amount greater than or equal to about 0.3 mol. % and less than or equal to about 0.6 mol. %.

In the embodiments described herein, the glass compositions are generally rich in MgO, (i.e., the concentration of MgO in the glass composition is greater than the concentration of the other alkaline earth oxides in the glass composition including, without limitation, CaO). Forming the glass composition such that the glass composition is MgO-rich improves the hydrolytic resistance of the resultant glass, particularly following ion exchange strengthening. Moreover, glass compositions which are MgO-rich generally exhibit improved ion exchange performance relative to glass compositions which are rich in other alkaline earth oxides. Specifically, glasses formed from MgO-rich glass compositions generally have a greater diffusivity than glass compositions which are rich in other alkaline earth oxides, such as CaO. The greater diffusivity enables the formation of a deeper depth of layer in the glass. MgO-rich glass compositions also enable a higher compressive stress to be achieved in the surface of the glass compared to glass compositions which are rich in other alkaline earth oxides such as CaO. In addition, it is generally understood that as the ion exchange process proceeds and alkali ions penetrate more deeply into the glass, the maximum compressive stress achieved at the surface of the glass may decrease with time. However, glasses formed from glass compositions which are MgO-rich exhibit a lower reduction in compressive stress than glasses formed from glass compositions that are CaO-rich or rich in other alkaline earth oxides (i.e., glasses which are MgO-poor). Thus, MgO-rich glass compositions enable glasses which have higher compressive stress at the surface and greater depths of layer than glasses which are rich in other alkaline earth oxides.

In order to fully realize the benefits of MgO in the glass compositions described herein, it has been determined that the ratio of the concentration of CaO to the sum of the concentration of CaO and the concentration of MgO in mol. % (i.e., (CaO/(CaO+MgO))) should be minimized. Specifically, it has been determined that (CaO/(CaO+MgO)) should be less than or equal to 0.5. In some embodiments (CaO/(CaO+MgO)) is less than or equal to 0.3 or even less than or equal to 0.2. In some other embodiments (CaO/(CaO+MgO)) may even be less than or equal to 0.1.

Boron oxide ($B_2O_3$) is a flux which may be added to glass compositions to reduce the viscosity at a given temperature (e.g., the strain, anneal and softening temperatures) thereby improving the formability of the glass. However, it has been found that additions of boron significantly decrease the diffusivity of sodium and potassium ions in the glass composition which, in turn, adversely impacts the ion exchange performance of the resultant glass. In particular, it has been found that additions of boron significantly increase the time required to achieve a given depth of layer relative to glass compositions which are boron free. Accordingly, in some embodiments described herein, the amount of boron added to the glass composition is minimized in order to improve the ion exchange performance of the glass composition.

For example, it has been determined that the impact of boron on the ion exchange performance of a glass composition can be mitigated by controlling the ratio of the concentration of $B_2O_3$ to the difference between the total concentration of the alkali oxides (i.e., $R_2O$, where R is the alkali metals) and alumina (i.e., $B_2O_3$ (mol. %)/($R_2O$ (mol. %)-$Al_2O_3$ (mol. %)). In particular, it has been determined that when the ratio of $B_2O_3/(R_2O—Al_2O_3)$ is greater than or equal to about 0 and less than about 0.3 or even less than about 0.2, the diffusivities of alkali oxides in the glass compositions are not diminished and, as such, the ion exchange performance of the glass composition is maintained. Accordingly, in some embodiments, the ratio of $B_2O_3/(R_2O—Al_2O_3)$ is greater than 0 and less than or equal to 0.3. In some of these embodiments, the ratio of $B_2O_3/(R_2O—Al_2O_3)$ is greater than 0 and less than or equal to 0.2. In some embodiments, the ratio of $B_2O_3/(R_2O—Al_2O_3)$ is greater than 0 and less than or equal to 0.15 or even less than or equal to 0.1. In some other embodiments, the ratio of $B_2O_3/(R_2O—Al_2O_3)$ may be greater than 0 and less than or equal to 0.05. Maintaining the ratio $B_2O_3/(R_2O—Al_2O_3)$ to be less than or equal to 0.3 or even less than or equal to 0.2 permits the inclusion of $B_2O_3$ to lower the strain point, anneal point and softening point of the glass composition without the $B_2O_3$ adversely impacting the ion exchange performance of the glass.

In the embodiments described herein, the concentration of $B_2O_3$ in the glass composition is generally less than or equal to about 4 mol. %, less than or equal to about 3 mol. %, less than or equal to about 2 mol. %, or even less than or equal to 1 mol. %. For example, in embodiments where $B_2O_3$ is present in the glass composition, the concentration of $B_2O_3$ may be greater than about 0.01 mol. % and less than or equal to 4 mol. %. In some of these embodiments, the concentration of $B_2O_3$ may be greater than about 0.01 mol. % and less than or equal to 3 mol. % In some embodiments, the $B_2O_3$ may be present in an amount greater than or equal to about 0.01 mol. % and less than or equal to 2 mol. %, or even less than or equal to 1.5 mol. %. Alternatively, the $B_2O_3$ may be present in an amount greater than or equal to about 1 mol. % and less than or equal to 4 mol. %, greater than or equal to about 1 mol. % and less than or equal to 3 mol. % or even greater than or equal to about 1 mol. % and less than or equal to 2 mol. %. In some of these embodiments, the concentration of $B_2O_3$ may be greater than or equal to about 0.1 mol. % and less than or equal to 1.0 mol. %.

While in some embodiments the concentration of $B_2O_3$ in the glass composition is minimized to improve the forming properties of the glass without detracting from the ion exchange performance of the glass, in some other embodiments the glass compositions are free from boron and compounds of boron such as $B_2O_3$. Specifically, it has been determined that forming the glass composition without boron or compounds of boron improves the ion exchangeability of the glass compositions by reducing the process time and/or temperature required to achieve a specific value of compressive stress and/or depth of layer.

In some embodiments of the glass compositions described herein, the glass compositions are free from phosphorous and compounds containing phosphorous including, without limitation, $P_2O_5$. Specifically, it has been determined that formulating the glass composition without phosphorous or compounds of phosphorous increases the chemical durability of the glass composition.

In addition to the $SiO_2$, $Al_2O_3$, alkali oxides and alkaline earth oxides, the glass compositions described herein may optionally further comprise one or more fining agents such as, for example, $SnO_2$, $As_2O_3$, and/or $Cl^-$ (from NaCl or the like). When a fining agent is present in the glass composition, the fining agent may be present in an amount less than or equal to about 1 mol. % or even less than or equal to about 0.4 mol. %. For example, in some embodiments the glass composition may include $SnO_2$ as a fining agent. In these embodiments $SnO_2$ may be present in the glass composition in an amount greater than about 0 mol. % and less than or equal to about 1 mol. % or even an amount greater than or equal to about 0.01 mol. % and less than or equal to about 0.30 mol. %.

Moreover, the glass compositions described herein may comprise one or more additional metal oxides to further improve the chemical durability of the glass composition. For example, the glass composition may further include ZnO, $TiO_2$, or $ZrO_2$, each of which further improves the resistance of the glass composition to chemical attack. In these embodiments, the additional metal oxide may be present in an amount which is greater than or equal to about 0 mol. % and less than or equal to about 2 mol. %. For example, when the additional metal oxide is ZnO, the ZnO may be present in an amount greater than or equal to 1 mol. % and less than or equal to about 2 mol. %. When the additional metal oxide is $ZrO_2$ or $TiO_2$, the $ZrO_2$ or $TiO_2$ may be present in an amount less than or equal to about 1 mol. %.

As noted above, the presence of alkali oxides in the glass composition facilitates chemically strengthening the glass by ion exchange. Specifically, alkali ions, such as potassium ions, sodium ions and the like, are sufficiently mobile in the glass to facilitate ion exchange. In some embodiments, the glass composition is ion exchangeable to form a compressive stress layer having a depth of layer greater than or equal to 10 μm. In some embodiments, the depth of layer may be greater than or equal to about 25 μm or even greater than or equal to about 50 μm. In some other embodiments, the depth of the layer may be greater than or equal to 75 μm or even greater than or equal to 100 μm. In still other embodiments, the depth of layer may be greater than or equal to 10 μm and less than or equal to about 100 μm. The associated surface compressive stress may be greater than or equal to about 250 MPa, greater than or equal to 300 MPa or even greater than or equal to about 350 MPa after the glass composition is treated in a salt bath of 100% molten $KNO_3$ at a temperature of 350° C. to 500° C. for a time period of less than about 30 hours or even about less than 20 hours.

During the ion exchange process, larger cations are introduced into the surface of the glass and replace (or are "exchanged" with) smaller cations having the same valence/charge/oxidation state. The increased cation size in the glass network places the surface under compression. That is, the replacement of smaller cations with larger cations forms a layer under compressive stress (i.e., the "compressive layer") that extends from the surface of the glass material to the depth of layer (DOL). For example, potassium ions in the salt bath may be introduced into a sodium-containing glass such that the larger $K^+$ cations replace smaller $Na^+$ cations, thus forming the compressive layer at the surface of the glass. To balance or compensate for the compressive stress at the surface, a tensile stress arises in the inner or central region of the glass material and is commonly referred to as a "central tension" or CT.

Figure 8:
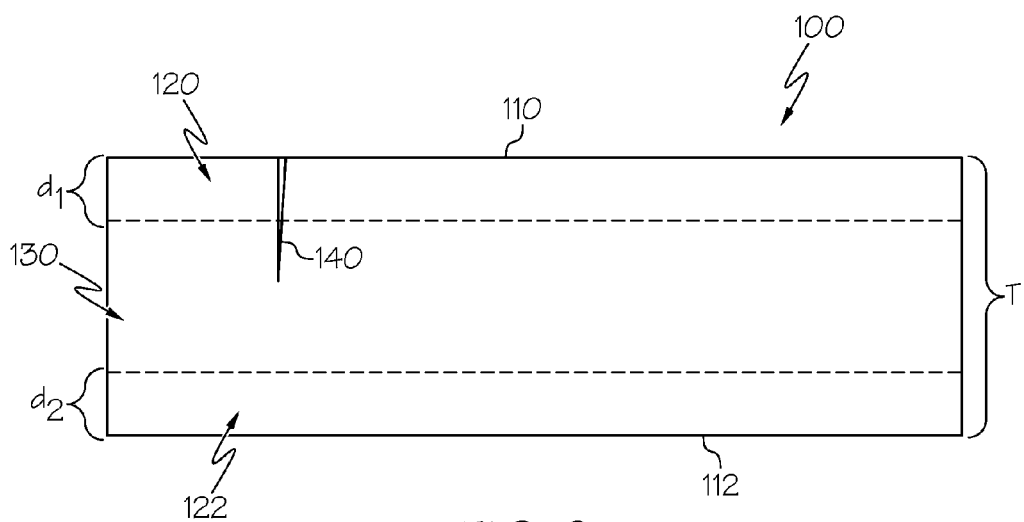
FIG. 8 schematically depicts a cross section of a strengthened glass article.

Referring to FIG. 8 by way of example, a cross section of a portion of a glass article 100 strengthened by ion exchange is schematically depicted. The depicted portion of the glass article 100 has a first surface 110 and a second surface 112 spaced apart by a thickness T of the glass article 100. The portion of the glass article 100 has a first compressive layer 120 which extends from the first surface 110 into the thickness T of the glass article 100 to a depth of layer $d_1$. In the embodiment depicted in FIG. 8, the glass article also has a second compressive layer 122 which extends from the second surface 112 into the thickness T of the glass article 100 to a depth of layer $d_2$. As a result of the compressive layers 120, 122, the glass article 100 also has a central region 130 which is under a tensile stress or central tension CT. The central region 130 extends from $d_1$ to $d_2$. The central tension CT balances or counteracts the compressive stresses of compressive layers 120, 122. The depth d1, d2 of the first and second compressive layers 120, 122 prevents flaws introduced by sharp impacts from propagating through the glass article 100 so long as the flaws are contained within either the first compressive layer 120 or the second compressive layer 122. However, when a flaw, such as flaw 140, penetrates through the compressive layer and into the central region 130, the central tension CT in the central region 130 facilitates the propagation of flaws through the glass article 100 when the central tension CT is above a threshold value. Thus, catastrophic failure of the glass article occurs when the flaw depth exceeds the depth of layer. That is, failure of the glass article occurs when the flaw 140 extends beyond the depth of layer $d_1$ of the compressive layer 120 and into the central region 130, as depicted in FIG. 8. The flaw 140 will then typically continue to penetrate through the central region to depths that are several times greater than the depth of layer.

Native damage resistance (NDR) refers to the ability of the glass to resist creation of large crack systems upon contact with a sharp feature, such as an object which may cause scratches and/or indentations in the glass. In ion exchange strengthened glasses, NDR relates to the ability of the glass to resist damage introduction from sharp indenters. Glass compositions which exhibit high NDR generally have improved cosmetic appearance following sharp contact damage relative to glass compositions with lower NDR. This improved cosmetic appearance is important for applications where automated visual inspection is used to identify small defects and inclusions (i.e., defects and inclusions with a size of less than 100 microns). Further, given the same sharp contact damage, glass compositions which exhibit high NDR experience less severe flaw introduction than glass compositions with lower NDR. The reduction in flaw severity leads to higher retained strength in the glass article following a damage event. Said differently, the reduction of the practical strength of the glass article resulting from sharp impact damage is substantially less for a glass composition exhibiting relatively high NDR than for a glass composition exhibiting relatively low NDR.

In the embodiments described herein, the NDR is measured by a Vickers indentation test which is performed by applying and then removing an indentation load to the glass surface at an indentation rate of 0.2 mm/min. The maximum load is held for 10 seconds. The indenter used is a Vickers indenter with a 4-sided pyramidal shape with each side having a 136° angle with respect to the central axis of the indenter. The Vickers crack initiation threshold is the measure of the native damage resistance of the glass and is defined as the indentation load at which 50% of 5 indents into the surface of the glass exhibit any number of radial/median cracks emanating from the corners of the indent impression. The maximum load is increased until the threshold is met for a given glass composition. The Vickers indentation test is performed at room temperature in 50% relative humidity.

Glass articles with greater Vickers crack initiation threshold values generally have a greater native damage resistance than glass articles with lower Vickers crack initiation threshold values. Glass articles formed from the glass compositions described herein generally have a Vickers crack initiation threshold, following ion exchange, of greater than or equal to about 7 kgf, such as greater than or equal to about 8 kgf, greater than or equal to about 9 kgf, or even greater than or equal to about 10 kgf. In some embodiments, the Vickers crack initiation threshold following ion exchange may be greater than or equal to about 11 kgf, such as greater than or equal to about 12 kgf, greater than or equal to about 13 kgf, greater than or equal to about 14 kgf, or even greater than or equal to about 15 kgf.

In embodiments, the Vickers crack initiation threshold following ion exchange may be less than or equal to about 30 kgf, such as less than or equal to 25 kgf or event less than or equal to about 20 kgf. In embodiments, the Vickers crack initiation threshold may be less than or equal to 19 kgf, less than or equal to 18 kgf, less than or equal to about 17 kgf, or even less than or equal to about 16 kgf. In some embodiments, the Vickers crack initiation threshold following ion exchange may be greater than or equal to about 7 kgf and less than or equal to about 30 kgf or even less than or equal to 25 kgf. In some embodiments, the Vickers crack initiation threshold following ion exchange may be greater than or equal to about 7 kgf and less than or equal to about 20 kgf. In some embodiments, the Vickers crack initiation threshold following ion exchange may be greater than or equal to about 7 kgf or even 8 kgf and less than or equal to about 10 kgf. In some embodiments, the Vickers crack initiation threshold following ion exchange may be greater than or equal to about 10 kgf and less than or equal to about 15 kgf. In some embodiments, the Vickers crack initiation threshold following ion exchange may be greater than or equal to about 10 kgf and less than or equal to about 20 kgf.

The glass articles formed from the glass compositions described herein may have a hydrolytic resistance of HGB2 or even HGB1 under ISO 719 and/or a hydrolytic resistance of HGA2 or even HGA1 under ISO 720 (as described further herein) in addition to having improved mechanical characteristics due to ion exchange strengthening. In some embodiments described herein the glass articles may have compressive stress layers which extend from the surface into the glass article to a depth of layer greater than or equal to 25 µm or even greater than or equal to 35 µm. In some embodiments, the depth of layer may be greater than or equal to 40 µm or even greater than or equal to 50 µm. The surface compressive stress of the glass article may be greater than or equal to 250 MPa, greater than or equal to 350 MPa, or even greater than or equal to 400 MPa. The glass compositions described herein facilitate achieving the aforementioned depths of layer and surface compressive stresses more rapidly and/or at lower temperatures than conventional glass compositions due to the enhanced alkali ion diffusivity of the glass compositions as described hereinabove. For example, the depths of layer (i.e., greater than or equal to 25 µm) and the compressive stresses (i.e., greater than or equal to 250 MPa) may be achieved by ion exchanging the glass article in a molten salt bath of 100% $KNO_3$ (or a mixed salt bath of $KNO_3$ and $NaNO_3$) for a time period of less than or equal to 5 hours, or even less than or equal to 4.5 hours, at a temperature less than or equal to 500° C. or even less than or equal to 450° C. In some embodiments, the time period for achieving these depths of layer and compressive stresses may be less than or equal to 4 hours or even less than or equal to 3.5 hours. The temperature for achieving these depths of layers and compressive stresses may be less than or equal to 400° C. or even less than or equal to 350° C.

These improved ion exchange characteristics can be achieved when the glass composition has a threshold diffusivity of greater than about 16 $\mu m^2$/hr at a temperature less than or equal to 450° C. or even greater than or equal to 20 $\mu m^2$/hr at a temperature less than or equal to 450° C. In some embodiments, the threshold diffusivity may be greater than or equal to about 25 μm²/hr at a temperature less than or equal to 450° C. or even 30 μm²/hr at a temperature less than or equal to 450° C. In some other embodiments, the threshold diffusivity may be greater than or equal to about 35 μm²/hr at a temperature less than or equal to 450° C. or even 40 μm²/hr at a temperature less than or equal to 450° C. In still other embodiments, the threshold diffusivity may be greater than or equal to about 45 μm²/hr at a temperature less than or equal to 450° C. or even 50 μm²/hr at a temperature less than or equal to 450° C.

The glass compositions described herein may generally have a strain point greater than or equal to about 525° C. and less than or equal to about 650° C. The glasses may also have an anneal point greater than or equal to about 560° C. and less than or equal to about 725° C. and a softening point greater than or equal to about 750° C. and less than or equal to about 960° C.

In the embodiments described herein the glass compositions have a CTE of less than about $70 \times 10^{-7} K^{-1}$ or even less than about $60 \times 10^{-7} K^{-1}$. These lower CTE values improve the survivability of the glass to thermal cycling or thermal stress conditions relative to glass compositions with higher CTEs.

Further, as noted hereinabove, the glass compositions are chemically durable and resistant to degradation as determined by the DIN 12116 standard, the ISO 695 standard, and the ISO 720 standard.

Specifically, the DIN 12116 standard is a measure of the resistance of the glass to decomposition when placed in an acidic solution. In brief, the DIN 12116 standard utilizes a polished glass sample of a known surface area which is weighed and then positioned in contact with a proportional amount of boiling 6M hydrochloric acid for 6 hours. The sample is then removed from the solution, dried and weighed again. The glass mass lost during exposure to the acidic solution is a measure of the acid durability of the sample with smaller numbers indicative of greater durability. The results of the test are reported in units of half-mass per surface area, specifically mg/dm². The DIN 12116 standard is broken into individual classes. Class S1 indicates weight losses of up to 0.7 mg/dm²; Class S2 indicates weight losses from 0.7 mg/dm² up to 1.5 mg/dm²; Class S3 indicates weight losses from 1.5 mg/dm² up to 15 mg/dm²; and Class S4 indicates weight losses of more than 15 mg/dm².

The ISO 695 standard is a measure of the resistance of the glass to decomposition when placed in a basic solution. In brief, the ISO 695 standard utilizes a polished glass sample which is weighed and then placed in a solution of boiling 1M NaOH+0.5M Na₂CO₃ for 3 hours. The sample is then removed from the solution, dried and weighed again. The glass mass lost during exposure to the basic solution is a measure of the base durability of the sample with smaller numbers indicative of greater durability. As with the DIN 12116 standard, the results of the ISO 695 standard are reported in units of mass per surface area, specifically mg/dm². The ISO 695 standard is broken into individual classes. Class A1 indicates weight losses of up to 75 mg/dm²; Class A2 indicates weight losses from 75 mg/dm² up to 175 mg/dm²; and Class A3 indicates weight losses of more than 175 mg/dm².

The ISO 720 standard is a measure of the resistance of the glass to degradation in purified, $CO_2$-free water. In brief, the ISO 720 standard protocol utilizes crushed glass grains which are placed in contact with the purified, $CO_2$-free water under autoclave conditions (121° C., 2 atm) for 30 minutes. The solution is then titrated colorimetrically with dilute HCl to neutral pH. The amount of HCl required to titrate to a neutral solution is then converted to an equivalent of $Na_2O$ extracted from the glass and reported in μg $Na_2O$ per weight of glass with smaller values indicative of greater durability. The ISO 720 standard is broken into individual types. Type HGA1 is indicative of up to 62 μg extracted equivalent of $Na_2O$ per gram of glass tested; Type HGA2 is indicative of more than 62 μg and up to 527 μg extracted equivalent of $Na_2O$ per gram of glass tested; and Type HGA3 is indicative of more than 527 μg and up to 930 μg extracted equivalent of $Na_2O$ per gram of glass tested.

The ISO 719 standard is a measure of the resistance of the glass to degradation in purified, $CO_2$-free water. In brief, the ISO 719 standard protocol utilizes crushed glass grains which are placed in contact with the purified, $CO_2$-free water at a temperature of 98° C. at 1 atmosphere for 30 minutes. The solution is then titrated colorimetrically with dilute HCl to neutral pH. The amount of HCl required to titrate to a neutral solution is then converted to an equivalent of $Na_2O$ extracted from the glass and reported in μg $Na_2O$ per weight of glass with smaller values indicative of greater durability. The ISO 719 standard is broken into individual types. The ISO 719 standard is broken into individual types. Type HGB1 is indicative of up to 31 μg extracted equivalent of $Na_2O$; Type HGB2 is indicative of more than 31 μg and up to 62 μg extracted equivalent of $Na_2O$; Type HGB3 is indicative of more than 62 μg and up to 264 μg extracted equivalent of $Na_2O$; Type HGB4 is indicative of more than 264 μg and up to 620 μg extracted equivalent of $Na_2O$; and Type HGB5 is indicative of more than 620 μg and up to 1085 μg extracted equivalent of $Na_2O$. The glass compositions described herein have an ISO 719 hydrolytic resistance of type HGB2 or better with some embodiments having a type HGB1 hydrolytic resistance.

The glass compositions described herein have an acid resistance of at least class S3 according to DIN 12116 both before and after ion exchange strengthening with some embodiments having an acid resistance of at least class S2 or even class S1 following ion exchange strengthening. In some other embodiments, the glass compositions may have an acid resistance of at least class S2 both before and after ion exchange strengthening with some embodiments having an acid resistance of class S1 following ion exchange strengthening. Further, the glass compositions described herein have a base resistance according to ISO 695 of at least class A2 before and after ion exchange strengthening with some embodiments having a class A1 base resistance at least after ion exchange strengthening. The glass compositions described herein also have an ISO 720 type HGA2 hydrolytic resistance both before and after ion exchange strengthening with some embodiments having a type HGA1 hydrolytic resistance after ion exchange strengthening and some other embodiments having a type HGA1 hydrolytic resistance both before and after ion exchange strengthening. The glass compositions described herein have an ISO 719 hydrolytic resistance of type HGB2 or better with some embodiments having a type HGB1 hydrolytic resistance. It should be understood that, when referring to the above referenced classifications according to DIN 12116, ISO 695, ISO 720 and ISO 719, a glass composition or glass article which has "at least" a specified classification means that the performance of the glass composition is as good as or better than the specified classification. For example, a glass article which has a DIN 12116 acid resistance of "at least class S2" may have a DIN 12116 classification of either S1 or S2.

The glass compositions described herein are formed by mixing a batch of glass raw materials (e.g., powders of $SiO_2$, $Al_2O_3$, alkali oxides, alkaline earth oxides and the like) such that the batch of glass raw materials has the desired composition. Thereafter, the batch of glass raw materials is heated to form a molten glass composition which is subsequently cooled and solidified to form the glass composition. During solidification (i.e., when the glass composition is plastically deformable) the glass composition may be shaped using standard forming techniques to shape the glass composition into a desired final form. Alternatively, the glass article may be shaped into a stock form, such as a sheet, tube or the like, and subsequently reheated and formed into the desired final form.

The glass compositions described herein may be shaped into glass articles having various forms such as, for example, sheets, tubes or the like. However, given the chemical durability of the glass composition, the glass compositions described herein are particularly well suited for use in the formation of glass articles used as pharmaceutical packages or pharmaceutical containers for containing pharmaceutical compositions, such as liquids, powders and the like. For example, the glass compositions described herein may be used to form glass containers having various shape forms including, without limitation, Vacutainers®, cartridges, syringes, ampoules, bottles, flasks, phials, tubes, beakers, vials or the like. Moreover, the ability to chemically strengthen the glass compositions through ion exchange can be utilized to improve the mechanical durability of such pharmaceutical packaging or glass articles formed from the glass composition. Accordingly, it should be understood that, in at least one embodiment, the glass compositions are incorporated in a pharmaceutical package in order to improve the chemical durability and/or the mechanical durability of the pharmaceutical packaging.

EXAMPLES

The embodiments of the glass compositions described herein will be further clarified by the following examples.

Example 1

Six exemplary inventive glass compositions (compositions A-F) were prepared. The specific compositions of each exemplary glass composition are reported below in Table 1. Multiple samples of each exemplary glass composition were produced. One set of samples of each composition was ion exchanged in a molten salt bath of 100% $KNO_3$ at a temperature of 450° C. for at least 5 hours to induce a compressive layer in the surface of the sample. The compressive layer had a surface compressive stress of at least 500 MPa and a depth of layer of at least 45 μm.

The chemical durability of each exemplary glass composition was then determined utilizing the DIN 12116 standard, the ISO 695 standard, and the ISO 720 standard described above. Specifically, non-ion exchanged test samples of each exemplary glass composition were subjected to testing according to one of the DIN 12116 standard, the ISO 695 standard, or the ISO 720 standard to determine the acid resistance, the base resistance or the hydrolytic resistance of the test sample, respectively. The hydrolytic resistance of the ion exchanged samples of each exemplary composition was determined according to the ISO 720 standard. To determine the hydrolytic resistance of the ion exchanged samples, the glass was crushed to the grain size required in the ISO 720 standard, ion exchanged in a molten salt bath of 100% $KNO_3$ at a temperature of 450° C. for at least 5 hours to induce a compressive stress layer in the individual grains of glass, and then tested according to the ISO 720 standard. The average results of all samples tested are reported below in Table 1.

As shown in Table 1, exemplary glass compositions A-F all demonstrated a glass mass loss of less than 5 mg/dm² and greater than 1 mg/dm² following testing according to the DIN 12116 standard with exemplary glass composition E having the lowest glass mass loss at 1.2 mg/dm². Accordingly, each of the exemplary glass compositions were classified in at least class S3 of the DIN 12116 standard, with exemplary glass composition E classified in class S2. Based on these test results, it is believed that the acid resistance of the glass samples improves with increased $SiO_2$ content.

Further, exemplary glass compositions A-F all demonstrated a glass mass loss of less than 80 mg/dm² following testing according to the ISO 695 standard with exemplary glass composition A having the lowest glass mass loss at 60 mg/dm². Accordingly, each of the exemplary glass compositions were classified in at least class A2 of the ISO 695 standard, with exemplary glass compositions A, B, D and F classified in class A1. In general, compositions with higher silica content exhibited lower base resistance and compositions with higher alkali/alkaline earth content exhibited greater base resistance.

Table 1 also shows that the non-ion exchanged test samples of exemplary glass compositions A-F all demonstrated a hydrolytic resistance of at least Type HGA2 following testing according to the ISO 720 standard with exemplary glass compositions C-F having a hydrolytic resistance of Type HGA1. The hydrolytic resistance of exemplary glass compositions C-F is believed to be due to higher amounts of $SiO_2$ and the lower amounts of $Na_2O$ in the glass compositions relative to exemplary glass compositions A and B.

Moreover, the ion exchanged test samples of exemplary glass compositions B-F demonstrated lower amounts of extracted $Na_2O$ per gram of glass than the non-ion exchanged test samples of the same exemplary glass compositions following testing according to the ISO 720 standard.

TABLE 1

Composition and Properties of Exemplary Glass Compositions

| | Composition in mole % | | | | | |
|---|---|---|---|---|---|---|
| | A | B | C | D | E | F |
| $SiO_2$ | 70.8 | 72.8 | 74.8 | 76.8 | 76.8 | 77.4 |
| $Al_2O_3$ | 7.5 | 7 | 6.5 | 6 | 6 | 7 |
| $Na_2O$ | 13.7 | 12.7 | 11.7 | 10.7 | 11.6 | 10 |
| $K_2O$ | 1 | 1 | 1 | 1 | 0.1 | 0.1 |
| MgO | 6.3 | 5.8 | 5.3 | 4.8 | 4.8 | 4.8 |
| CaO | 0.5 | 0.5 | 0.5 | 0.5 | 0.5 | 0.5 |
| $SnO_2$ | 0.2 | 0.2 | 0.2 | 0.2 | 0.2 | 0.2 |
| DIN 12116 (mg/dm²) | 3.2 | 2.0 | 1.7 | 1.6 | 1.2 | 1.7 |
| classification | S3 | S3 | S3 | S3 | S2 | S3 |
| ISO 695 (mg/dm²) | 60.7 | 65.4 | 77.9 | 71.5 | 76.5 | 62.4 |
| classification | A1 | A1 | A2 | A1 | A2 | A1 |
| ISO 720 (μg $Na_2O$/g glass) | 100.7 | 87.0 | 54.8 | 57.5 | 50.7 | 37.7 |
| classification | HGA2 | HGA2 | HGA1 | HGA1 | HGA1 | HGA1 |
| ISO 720 (with IX) (μg $Na_2O$/g glass) | 60.3 | 51.9 | 39.0 | 30.1 | 32.9 | 23.3 |
| classification | HGA1 | HGA1 | HGA1 | HGA1 | HGA1 | HGA1 |

Example 2

Three exemplary inventive glass compositions (compositions G-I) and three comparative glass compositions (compositions 1-3) were prepared. The ratio of alkali oxides to alumina (i.e., Y:X) was varied in each of the compositions in order to assess the effect of this ratio on various properties of the resultant glass melt and glass. The specific compositions of each of the exemplary inventive glass compositions and the comparative glass compositions are reported in Table 2. The strain point, anneal point, and softening point of melts formed from each of the glass compositions were determined and are reported in Table 2. In addition, the coefficient of thermal expansion (CTE), density, and stress optic coefficient (SOC) of the resultant glasses were also determined and are reported in Table 2. The hydrolytic resistance of glass samples formed from each exemplary inventive glass composition and each comparative glass composition was determined according to the ISO 720 Standard both before ion exchange and after ion exchange in a molten salt bath of 100% $KNO_3$ at 450° C. for 5 hours. For those samples that were ion exchanged, the compressive stress was determined with a fundamental stress meter (FSM) instrument, with the compressive stress value based on the measured stress optical coefficient (SOC). The FSM instrument couples light into and out of the birefringent glass surface. The measured birefringence is then related to stress through a material constant, the stress-optic or photoelastic coefficient (SOC or PEC) and two parameters are obtained: the maximum surface compressive stress (CS) and the exchanged depth of layer (DOL). The diffusivity of the alkali ions in the glass and the change in stress per square root of time were also determined. The diffusivity (D) of the glass is calculated from the measured depth of layer (DOL) and the ion exchange time (t) according to the relationship: $DOL=\sim 1.4*sqrt(4*D*t)$. Diffusivity increases with temperature according to an Arrhenius relationship, and, as such, it is reported at a specific temperature.

TABLE 2

Glass properties as a funtion of alkali to alumina ratio
Composition Mole %

|  | G | H | I | 1 | 2 | 3 |
|---|---|---|---|---|---|---|
| $SiO_2$ | 76.965 | 76.852 | 76.962 | 76.919 | 76.960 | 77.156 |
| $Al_2O_3$ | 5.943 | 6.974 | 7.958 | 8.950 | 4.977 | 3.997 |
| $Na_2O$ | 11.427 | 10.473 | 9.451 | 8.468 | 12.393 | 13.277 |
| $K_2O$ | 0.101 | 0.100 | 0.102 | 0.105 | 0.100 | 0.100 |
| MgO | 4.842 | 4.878 | 4.802 | 4.836 | 4.852 | 4.757 |
| CaO | 0.474 | 0.478 | 0.481 | 0.480 | 0.468 | 0.462 |
| $SnO_2$ | 0.198 | 0.195 | 0.197 | 0.197 | 0.196 | 0.196 |
| Strain (° C.) | 578 | 616 | 654 | 683 | 548 | 518 |
| Anneal (° C.) | 633 | 674 | 716 | 745 | 600 | 567 |
| Softening (° C.) | 892 | 946 | 1003 | 1042 | 846 | 798 |
| Expansion ($10^{-7} K^{-1}$) | 67.3 | 64.3 | 59.3 | 55.1 | 71.8 | 74.6 |
| Density (g/cm³) | 2.388 | 2.384 | 2.381 | 2.382 | 2.392 | 2.396 |
| SOC (nm/mm/MPa) | 3.127 | 3.181 | 3.195 | 3.232 | 3.066 | 3.038 |
| ISO720 (non-IX) | 88.4 | 60.9 | 47.3 | 38.4 | 117.1 | 208.1 |
| ISO720 (IX450° C.-5 hr) | 25.3 | 26 | 20.5 | 17.8 | 57.5 | 102.5 |
| $R_2O/Al_2O_3$ | 1.940 | 1.516 | 1.200 | 0.958 | 2.510 | 3.347 |
| CS@t = 0 (MPa) | 708 | 743 | 738 | 655 | 623 | 502 |
| CS/√t (MPa/hr$^{1/2}$) | −35 | −24 | −14 | −7 | −44 | −37 |
| D (µm²/hr) | 52.0 | 53.2 | 50.3 | 45.1 | 51.1 | 52.4 |

The data in Table 2 indicates that the alkali to alumina ratio Y:X influences the melting behavior, hydrolytic resistance, and the compressive stress obtainable through ion exchange strengthening. In particular, FIG. 1 graphically depicts the strain point, anneal point, and softening point as a function of Y:X ratio for the glass compositions of Table 2. FIG. 1 demonstrates that, as the ratio of Y:X decreases below 0.9, the strain point, anneal point, and softening point of the glass rapidly increase. Accordingly, to obtain a glass which is readily meltable and formable, the ratio Y:X should be greater than or equal to 0.9 or even greater than or equal to 1.

Further, the data in Table 2 indicates that the diffusivity of the glass compositions generally decreases with the ratio of Y:X. Accordingly, to achieve glasses that can be rapidly ion exchanged in order to reduce process times (and costs) the ratio of Y:X should be greater than or equal to 0.9 or even greater than or equal to 1.

Figure 2:
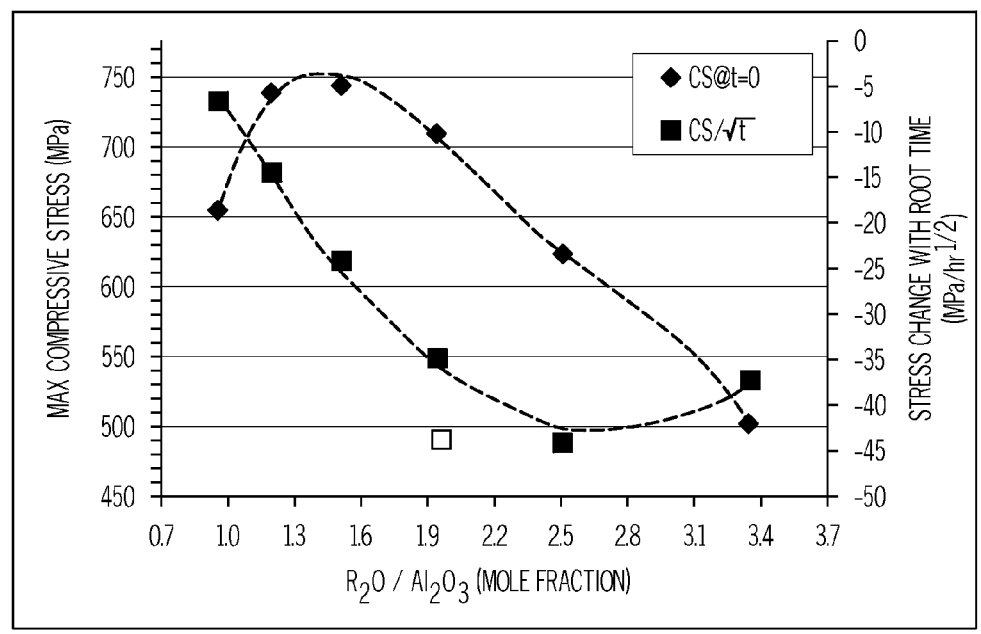
FIG. 2 graphically depicts the relationship between the ratio of alkali oxides to alumina (x-axis) and the maximum compressive stress and stress change (y-axes) of inventive and comparative glass compositions.

Moreover, FIG. 2 indicates that for a given ion exchange time and ion exchange temperature, the maximum compressive stresses are obtained when the ratio of Y:X is greater than or equal to about 0.9, or even greater than or equal to about 1, and less than or equal to about 2, specifically greater than or equal to about 1.3 and less than or equal to about 2.0. Accordingly, the maximum improvement in the load bearing strength of the glass can be obtained when the ratio of Y:X is greater than about 1 and less than or equal to about 2. It is generally understood that the maximum stress achievable by ion exchange will decay with increasing ion-exchange duration as indicated by the stress change rate (i.e., the measured compressive stress divided by the square root of the ion exchange time). FIG. 2 generally shows that the stress change rate decreases as the ratio Y:X decreases.

Figure 3:
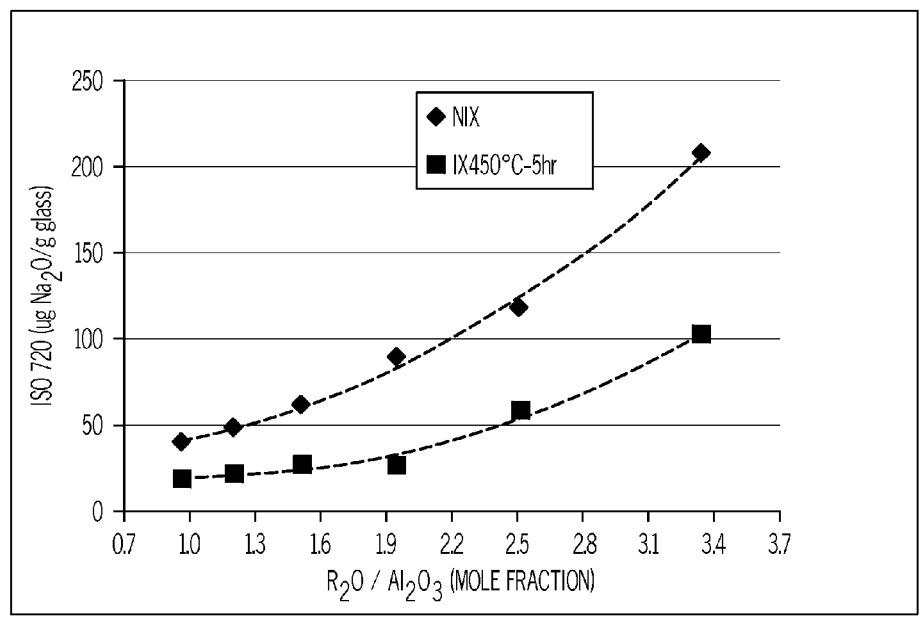
FIG. 3 graphically depicts the relationship between the ratio of alkali oxides to alumina (x-axis) and hydrolytic resistance as determined from the ISO 720 standard (y-axis) of inventive and comparative glass compositions.

FIG. 3 graphically depicts the hydrolytic resistance (y-axis) as a function of the ratio Y:X (x-axis). As shown in FIG. 3, the hydrolytic resistance of the glasses generally improves as the ratio Y:X decreases.

Based on the foregoing it should be understood that glasses with good melt behavior, superior ion exchange performance, and superior hydrolytic resistance can be achieved by maintaining the ratio Y:X in the glass from greater than or equal to about 0.9, or even greater than or equal to about 1, and less than or equal to about 2.

Example 3

Three exemplary inventive glass compositions (compositions J-L) and three comparative glass compositions (compositions 4-6) were prepared. The concentration of MgO and CaO in the glass compositions was varied to produce both MgO-rich compositions (i.e., compositions J-L and 4) and CaO-rich compositions (i.e., compositions 5-6). The relative amounts of MgO and CaO were also varied such that the glass compositions had different values for the ratio (CaO/(CaO+MgO)). The specific compositions of each of the exemplary inventive glass compositions and the comparative glass compositions are reported below in Table 3. The properties of each composition were determined as described above with respect to Example 2.

TABLE 3

Glass properties as function of CaO content
Composition Mole %

|  | J | K | L | 4 | 5 | 6 |
|---|---|---|---|---|---|---|
| $SiO_2$ | 76.99 | 77.10 | 77.10 | 77.01 | 76.97 | 77.12 |
| $Al_2O_3$ | 5.98 | 5.97 | 5.96 | 5.96 | 5.97 | 5.98 |
| $Na_2O$ | 11.38 | 11.33 | 11.37 | 11.38 | 11.40 | 11.34 |
| $K_2O$ | 0.10 | 0.10 | 0.10 | 0.10 | 0.10 | 0.10 |
| MgO | 5.23 | 4.79 | 3.78 | 2.83 | 1.84 | 0.09 |
| CaO | 0.07 | 0.45 | 1.45 | 2.46 | 3.47 | 5.12 |
| $SnO_2$ | 0.20 | 0.19 | 0.19 | 0.19 | 0.19 | 0.19 |
| Strain (° C.) | 585 | 579 | 568 | 562 | 566 | 561 |
| Anneal (° C.) | 641 | 634 | 620 | 612 | 611 | 610 |

TABLE 3-continued

Glass properties as function of CaO content
Composition Mole %

|  | J | K | L | 4 | 5 | 6 |
|---|---|---|---|---|---|---|
| Softening (° C.) | 902 | 895 | 872 | 859 | 847 | 834 |
| Expansion ($10^{-7}$ $K^{-1}$) | 67.9 | 67.1 | 68.1 | 68.8 | 69.4 | 70.1 |
| Density (g/cm³) | 2.384 | 2.387 | 2.394 | 2.402 | 2.41 | 2.42 |
| SOC nm/mm/MPa | 3.12 | 3.08 | 3.04 | 3.06 | 3.04 | 3.01 |
| ISO720 (non-IX) | 83.2 | 83.9 | 86 | 86 | 88.7 | 96.9 |
| ISO720 (IX450° C.-5 hr) | 29.1 |  | 28.4 | 33.2 | 37.3 | 40.1 |
| Fraction of RO as CaO | 0.014 | 0.086 | 0.277 | 0.465 | 0.654 | 0.982 |
| CS@t = 0 (MPa) | 707 | 717 | 713 | 689 | 693 | 676 |
| CS/√t (MPa/hr$^{1/2}$) | −36 | −37 | −39 | −38 | −43 | −44 |
| D (μm²/hr) | 57.2 | 50.8 | 40.2 | 31.4 | 26.4 | 20.7 |

Figure 4:
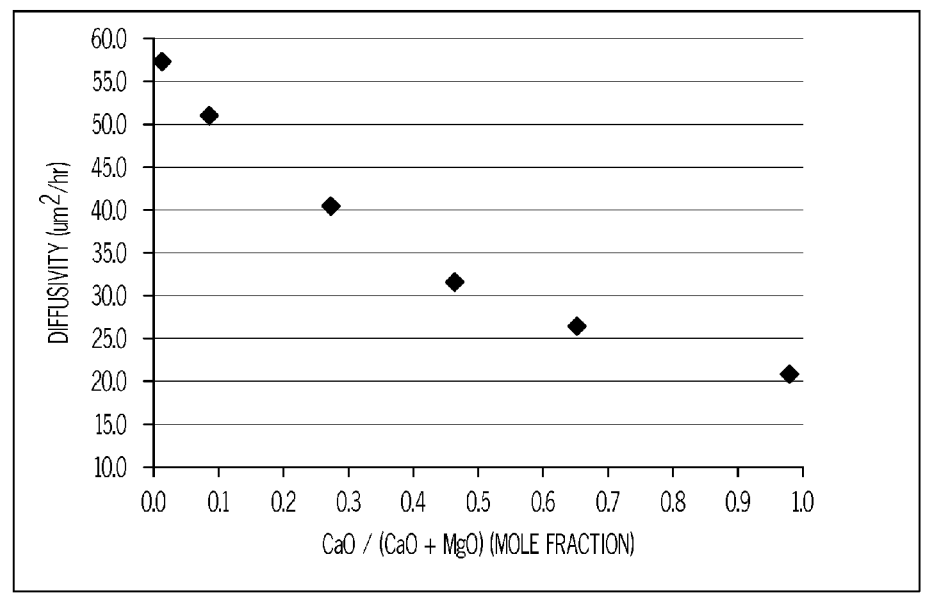
FIG. 4 graphically depicts diffusivity D (y-axis) as a function of the ratio (CaO/(CaO+MgO)) (x-axis) for inventive and comparative glass compositions.
Figure 5:
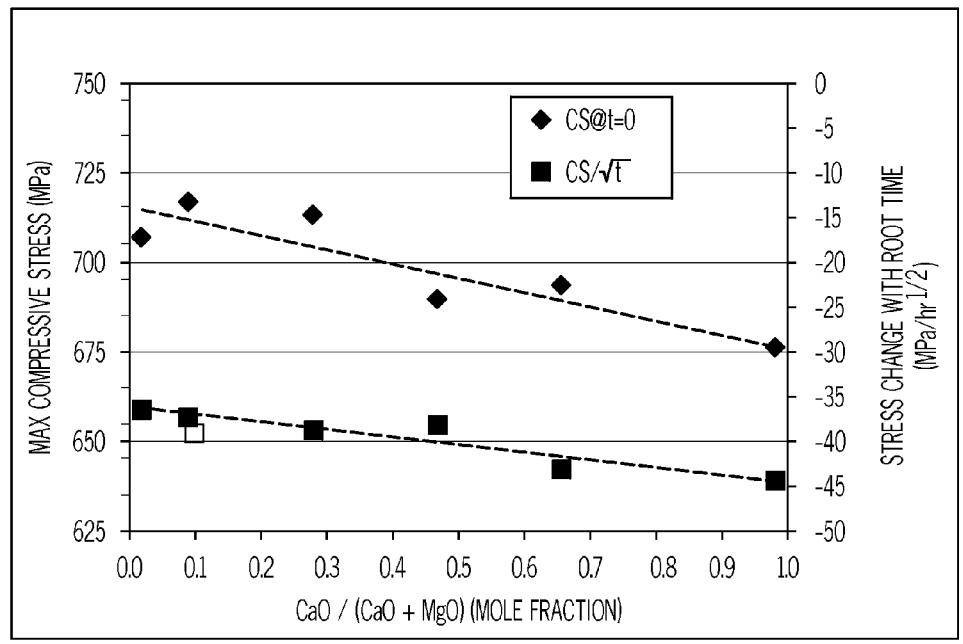
FIG. 5 graphically depicts the maximum compressive stress (y-axis) as a function of the ratio (CaO/(CaO+MgO)) (x-axis) for inventive and comparative glass compositions.

FIG. 4 graphically depicts the diffusivity D of the compositions listed in Table 3 as a function of the ratio (CaO/(CaO+MgO)). Specifically, FIG. 4 indicates that as the ratio (CaO/(CaO+MgO)) increases, the diffusivity of alkali ions in the resultant glass decreases thereby diminishing the ion exchange performance of the glass. This trend is supported by the data in Table 3 and FIG. 5. FIG. 5 graphically depicts the maximum compressive stress and stress change rate (y-axes) as a function of the ratio (CaO/(CaO+MgO)). FIG. 5 indicates that as the ratio (CaO/(CaO+MgO)) increases, the maximum obtainable compressive stress decreases for a given ion exchange temperature and ion exchange time. FIG. 5 also indicates that as the ratio (CaO/(CaO+MgO)) increases, the stress change rate increases (i.e., becomes more negative and less desirable).

Accordingly, based on the data in Table 3 and FIGS. 4 and 5, it should be understood that glasses with higher diffusivities can be produced by minimizing the ratio (CaO/(CaO+MgO)). It has been determined that glasses with suitable diffusivities can be produced when the (CaO/(CaO+MgO)) ratio is less than about 0.5. The diffusivity values of the glass when the (CaO/(CaO+MgO)) ratio is less than about 0.5 decreases the ion exchange process times needed to achieve a given compressive stress and depth of layer. Alternatively, glasses with higher diffusivities due to the ratio (CaO/(CaO+MgO)) may be used to achieve a higher compressive stress and depth of layer for a given ion exchange temperature and ion exchange time.

Moreover, the data in Table 3 also indicates that decreasing the ratio (CaO/(CaO+MgO)) by increasing the MgO concentration generally improves the resistance of the glass to hydrolytic degradation as measured by the ISO 720 standard.

Example 4

Three exemplary inventive glass compositions (compositions M-O) and three comparative glass compositions (compositions 7-9) were prepared. The concentration of $B_2O_3$ in the glass compositions was varied from 0 mol. % to about 4.6 mol. % such that the resultant glasses had different values for the ratio $B_2O_3/(R_2O—Al_2O_3)$. The specific compositions of each of the exemplary inventive glass compositions and the comparative glass compositions are reported below in Table 4. The properties of each glass composition were determined as described above with respect to Examples 2 and 3.

TABLE 4

Glass properties as a function of $B_2O_3$ content
Composition Mole %

|  | M | N | O | 7 | 8 | 9 |
|---|---|---|---|---|---|---|
| $SiO_2$ | 76.860 | 76.778 | 76.396 | 74.780 | 73.843 | 72.782 |
| $Al_2O_3$ | 5.964 | 5.948 | 5.919 | 5.793 | 5.720 | 5.867 |
| $B_2O_3$ | 0.000 | 0.214 | 0.777 | 2.840 | 4.443 | 4.636 |
| $Na_2O$ | 11.486 | 11.408 | 11.294 | 11.036 | 10.580 | 11.099 |
| $K_2O$ | 0.101 | 0.100 | 0.100 | 0.098 | 0.088 | 0.098 |
| MgO | 4.849 | 4.827 | 4.801 | 4.754 | 4.645 | 4.817 |
| CaO | 0.492 | 0.480 | 0.475 | 0.463 | 0.453 | 0.465 |
| $SnO_2$ | 0.197 | 0.192 | 0.192 | 0.188 | 0.183 | 0.189 |
| Strain (° C.) | 579 | 575 | 572 | 560 | 552 | 548 |
| Anneal (° C.) | 632 | 626 | 622 | 606 | 597 | 590 |
| Softening (° C.) | 889 | 880 | 873 | 836 | 816 | 801 |
| Expansion ($10^{-7}$ $K^{-1}$) | 68.3 | 67.4 | 67.4 | 65.8 | 64.1 | 67.3 |
| Density (g/cm³) | 2.388 | 2.389 | 2.390 | 2.394 | 2.392 | 2.403 |
| SOC (nm/mm/MPa) | 3.13 | 3.12 | 3.13 | 3.17 | 3.21 | 3.18 |
| ISO720 (non-IX) | 86.3 | 78.8 | 68.5 | 64.4 | 52.7 | 54.1 |
| ISO720 (IX450° C.-5 hr) | 32.2 | 30.1 | 26 | 24.7 | 22.6 | 26.7 |
| $B_2O_3/(R_2O—Al_2O_3)$ | 0.000 | 0.038 | 0.142 | 0.532 | 0.898 | 0.870 |
| CS@t = 0 (MPa) | 703 | 714 | 722 | 701 | 686 | 734 |
| CS/√t (MPa/hr$^{1/2}$) | −38 | −38 | −38 | −33 | −32 | −39 |
| D (μm²/hr) | 51.7 | 43.8 | 38.6 | 22.9 | 16.6 | 15.6 |

Figure 6:
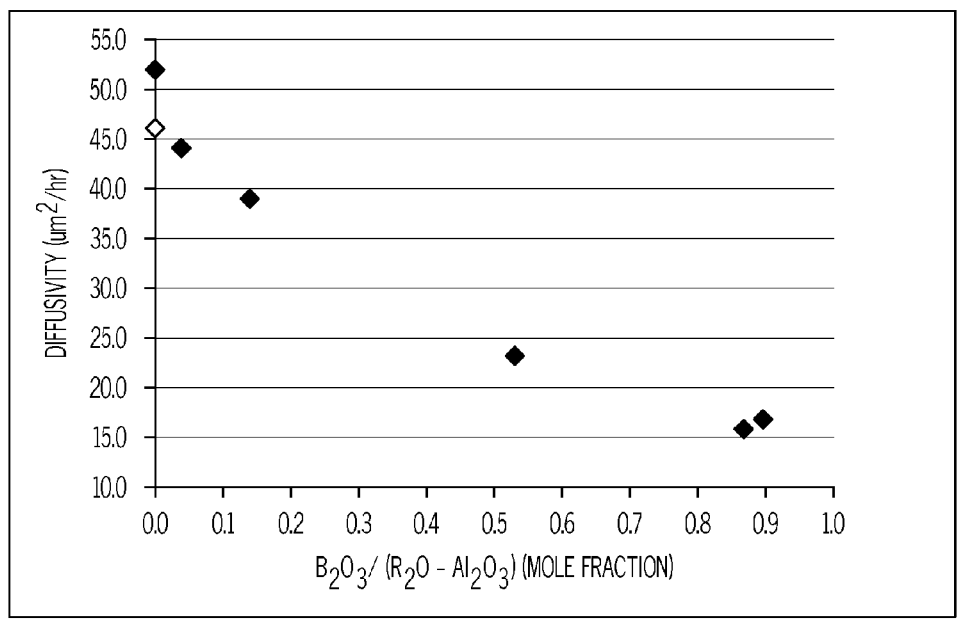
FIG. 6 graphically depicts diffusivity D (y-axis) as a function of the ratio ($B_2O_3/(R_2O—Al_2O_3$)) (x-axis) for inventive and comparative glass compositions.

FIG. 6 graphically depicts the diffusivity D (y-axis) of the glass compositions in Table 4 as a function of the ratio $B_2O_3/(R_2O—Al_2O_3)$ (x-axis) for the glass compositions of Table 4. As shown in FIG. 6, the diffusivity of alkali ions in the glass generally decreases as the ratio $B_2O_3/(R_2O—Al_2O_3)$ increases.

Figure 7:
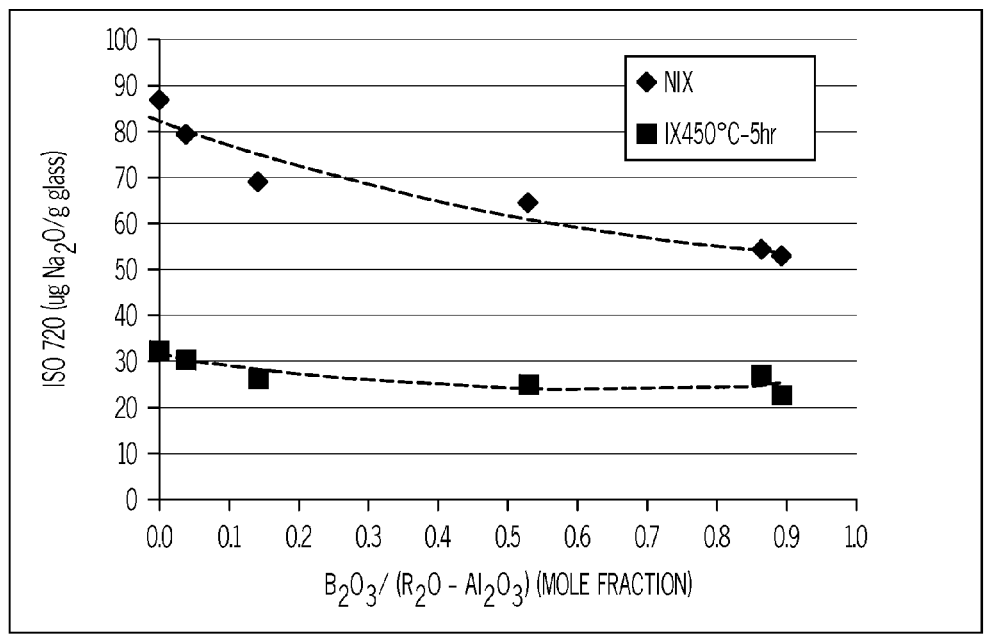
FIG. 7 graphically depicts the hydrolytic resistance as determined from the ISO 720 standard (y-axis) as a function of the ratio ($B_2O_3/(R_2O—Al_2O_3$)) (x-axis) for inventive and comparative glass compositions.

FIG. 7 graphically depicts the hydrolytic resistance according to the ISO 720 standard (y-axis) as a function of the ratio $B_2O_3/(R_2O—Al_2O_3)$ (x-axis) for the glass compositions of Table 4. As shown in FIG. 6, the hydrolytic resistance of the glass compositions generally improves as the ratio $B_2O_3/(R_2O—Al_2O_3)$ increases.

Based on FIGS. 6 and 7, it should be understood that minimizing the ratio $B_2O_3/(R_2O—Al_2O_3)$ improves the diffusivity of alkali ions in the glass thereby improving the ion exchange characteristics of the glass. Further, increasing the ratio $B_2O_3/(R_2O—Al_2O_3)$ also generally improves the resistance of the glass to hydrolytic degradation. In addition, it has been found that the resistance of the glass to degradation in acidic solutions (as measured by the DIN 12116 standard) generally improves with decreasing concentrations of $B_2O_3$. Accordingly, it has been determined that maintaining the ratio $B_2O_3/(R_2O—Al_2O_3)$ to less than or equal to about 0.3 provides the glass with improved hydrolytic and acid resistances as well as providing for improved ion exchange characteristics.

Referring now to Tables 5A-5D below, a series of different glass articles having the glass compositions shown in Tables 5A-5D were tested with the Vickers indentation test to determine the Vickers crack initiation threshold for each glass article as a measure of the native damage resistance of the glass. To perform the test, the glass compositions listed in Table 5 were melted and formed into glass plates with each plate having a thickness of 1 mm, a length of 25.4 mm, and a width of 25.4 mm. The plates were then ion exchanged in a 100% $KNO_3$ salt bath at a temperature of 450° C. for 8 hours.

TABLE 5A

Vickers Crack Initiation Threshold For Different Glass Compositions
Composition Mole %

| | A<br>722AEM | B<br>722AEN | C<br>722AEO | D<br>722AEP | E<br>722AEQ | F<br>722AER | P<br>722ANY | Q<br>722ANZ |
|---|---|---|---|---|---|---|---|---|
| $SiO_2$ | 70.8 | 72.8 | 74.8 | 76.8 | 76.8 | 77.4 | 76.8 | 76.8 |
| $Al_2O_3$ | 7.5 | 7.0 | 6.5 | 6.0 | 6.0 | 7.0 | 6.0 | 6.0 |
| $B_2O_3$ | | | | | | | | |
| $P_2O_5$ | | | | | | | | |
| $Li_2O$ | | | | | | | | |
| $Na_2O$ | 13.7 | 12.7 | 11.7 | 10.7 | 11.6 | 10.0 | 11.6 | 11.6 |
| $K_2O$ | 1.0 | 1.0 | 1.0 | 1.0 | 0.1 | 0.1 | 0.1 | 0.1 |
| MgO | 6.3 | 5.8 | 5.3 | 4.8 | 4.8 | 4.8 | 5.2 | 4.8 |
| CaO | 0.5 | 0.5 | 0.5 | 0.5 | 0.5 | 0.5 | 0.1 | 0.5 |
| SrO | | | | | | | | |
| BaO | | | | | | | | |
| $ZrO_2$ | | | | | | | | |
| $SnO_2$ | 0.2 | 0.2 | 0.2 | 0.2 | 0.2 | 0.2 | 0.2 | 0.2 |
| Indentation Threshold | 8000-9000 g | 10000-15000 g | 10000-15000 g | 10000-15000 g | 10000-15000 g | 10000-15000 g | 15000-20000 g | 10000-15000 g |

TABLE 5B

Vickers Crack Initiation Threshold For Different Glass Compositions
Composition Mole %

| | R<br>722AOA | S<br>722AOB | T<br>722AOC | U<br>722AOD | V<br>722AOE | W<br>722AOF | X<br>722AOG | Y<br>722AOH |
|---|---|---|---|---|---|---|---|---|
| $SiO_2$ | 76.8 | 76.8 | 76.8 | 76.8 | 76.8 | 76.4 | 76 | 74.6 |
| $Al_2O_3$ | 6.0 | 6.0 | 6.0 | 6.0 | 6.0 | 6.0 | 5.9 | 5.8 |
| $B_2O_3$ | | | | | 0.0 | 0.5 | 1.0 | 2.9 |
| $P_2O_5$ | | | | | | | | |
| $Li_2O$ | | | | | | | | |
| $Na_2O$ | 11.6 | 11.6 | 11.6 | 11.6 | 11.6 | 11.5 | 11.5 | 11.3 |
| $K_2O$ | 0.1 | 0.1 | 0.1 | 0.1 | 0.1 | 0.1 | 0.1 | 0.1 |
| MgO | 3.8 | 2.8 | 1.8 | 0.1 | 4.8 | 4.8 | 4.8 | 4.7 |
| CaO | 1.5 | 2.5 | 3.5 | 5.2 | 0.5 | 0.5 | 0.5 | 0.5 |
| SrO | | | | | | | | |
| BaO | | | | | | | | |
| $ZrO_2$ | | | | | | | | |
| $SnO_2$ | 0.2 | 0.2 | 0.2 | 0.2 | 0.2 | 0.2 | 0.2 | 0.2 |
| Indentation Threshold | 8000-9000 g | 9000-10000 g | 7000-8000 g | 6000-7000 g | 10000-15000 g | 9000-10000 g | 10000-15000 g | 8000-9000 g |

TABLE 5C

Vickers Crack Initiation Threshold For Different Glass Compositions
Composition Mole %

| | 10<br>722AOI | 11<br>722AOJ | Z<br>722AOK | AA<br>722AOL | BB<br>722AOM | CC<br>722AON | DD<br>722AOO | EE<br>722AOP |
|---|---|---|---|---|---|---|---|---|
| $SiO_2$ | 73.1 | 71.8 | 76.8 | 76.8 | 76.8 | 76.8 | 76.8 | 76.8 |
| $Al_2O_3$ | 5.7 | 6.0 | 6.0 | 7.0 | 8.0 | 9.0 | 5.0 | 4.0 |
| $B_2O_3$ | 4.8 | 5.0 | | | | | | |
| $P_2O_5$ | | | | | | | | |
| $Li_2O$ | | | | | | | | |
| $Na_2O$ | 11.0 | 11.6 | 11.6 | 10.6 | 9.6 | 8.6 | 12.6 | 13.6 |
| $K_2O$ | 0.1 | 0.1 | 0.1 | 0.1 | 0.1 | 0.1 | 0.1 | 0.1 |
| MgO | 4.6 | 4.8 | 4.8 | 4.8 | 4.8 | 4.8 | 4.8 | 4.8 |
| CaO | 0.5 | 0.5 | 0.5 | 0.5 | 0.5 | 0.5 | 0.5 | 0.5 |
| SrO | | | | | | | | |
| BaO | | | | | | | | |
| $ZrO_2$ | | | | | | | | |
| $SnO_2$ | 0.2 | 0.2 | 0.2 | 0.2 | 0.2 | 0.2 | 0.2 | 0.2 |
| Indentation Threshold | 6000-7000 g | 6000-7000 g | 9000-10000 g | 10000-15000 g | 10000-15000 g | 9000-10000 g | 7000-8000 g | 2000-3000 g |

TABLE 5D

Vickers Crack Initiation Threshold For Different Glass Compositions
Composition Mole %

| | 12<br>722AQA | 13<br>722AQB | FF<br>722AQC | GG<br>722AQD | HH<br>722AQE | II<br>722AQF |
|---|---|---|---|---|---|---|
| $SiO_2$ | 65.0 | 68.0 | 71.0 | 74.0 | 77.0 | 80.0 |
| $Al_2O_3$ | 9.1 | 8.3 | 7.5 | 6.7 | 5.9 | 5.2 |
| $B_2O_3$ | | | | | | |
| $P_2O_5$ | | | | | | |
| $Li_2O$ | | | | | | |
| $Na_2O$ | 17.5 | 16.0 | 14.5 | 13.0 | 11.5 | 10.0 |
| $K_2O$ | 0.2 | 0.1 | 0.1 | 0.1 | 0.1 | 0.1 |
| MgO | 7.2 | 6.6 | 6.0 | 5.4 | 4.8 | 4.1 |
| CaO | 0.8 | 0.7 | 0.6 | 0.6 | 0.5 | 0.4 |
| SrO | | | | | | |
| BaO | | | | | | |
| $ZrO_2$ | | | | | | |
| $SnO_2$ | 0.3 | 0.3 | 0.3 | 0.2 | 0.2 | 0.2 |
| Indentation<br>Threshold | 5000-<br>6000 g | 6000-<br>7000 g | 6000-<br>7000 g | 8000-<br>9000 g | 7000-<br>8000 g | 10000-<br>15000 g |

Following ion exchange, glass plates of each composition were subjected to the Vickers indentation test to determine the Vickers crack initiation threshold for the glass composition. The Vickers indentation test was performed by applying and then removing an indentation load to the glass surface at an indentation rate of 0.2 mm/min. The maximum load was held for 10 seconds. The indenter used was a Vickers indenter with a 4-sided pyramidal shape with each side having a 136° angle with respect to the central axis of the indenter. The test was performed on plates of the same composition under the same indentation load. The Vickers crack initiation threshold was determined to be the indentation load at which 50% of greater than 5 indents exhibited any number of radial/median cracks emanating from the corners of the indent impression. The testing procedure was repeated for multiple sets of samples with an increased maximum indentation load until the Vickers crack initiation threshold was determined for a given glass composition. All indentation measurements were performed at room temperature in 50% relative humidity. The Vickers crack initiation threshold for each of the tested glass compositions is reported in Tables 5A-5D.

Figure 9:
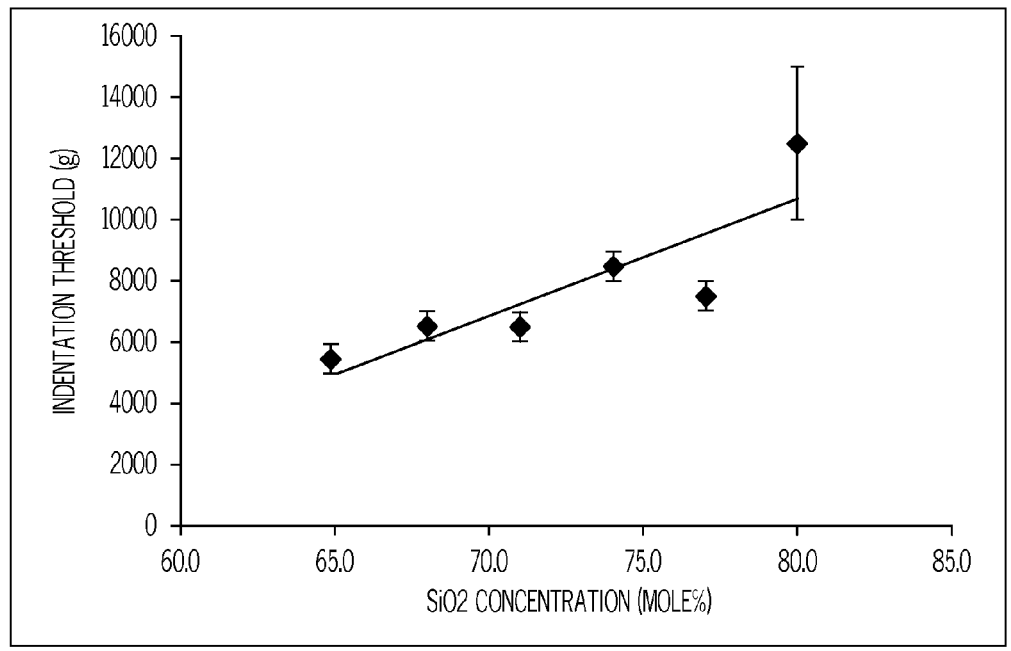
FIG. 9 graphically depicts the Vickers indentation threshold (y-axis) as a function of the $SiO_2$ concentration (x-axis) in the glass composition.

Referring to Tables 5A-5D, increasing the concentration of $SiO_2$ in the glass composition generally increases the Vickers indentation threshold. For example, FIG. 9 graphically depicts the Vickers indentation threshold (y-axis) as a function of the $SiO_2$ concentration (x-axis) for examples 12, 13 and FF-II, demonstrating that the Vickers indentation threshold generally increases with increasing $SiO_2$ concentration.

Figure 10:
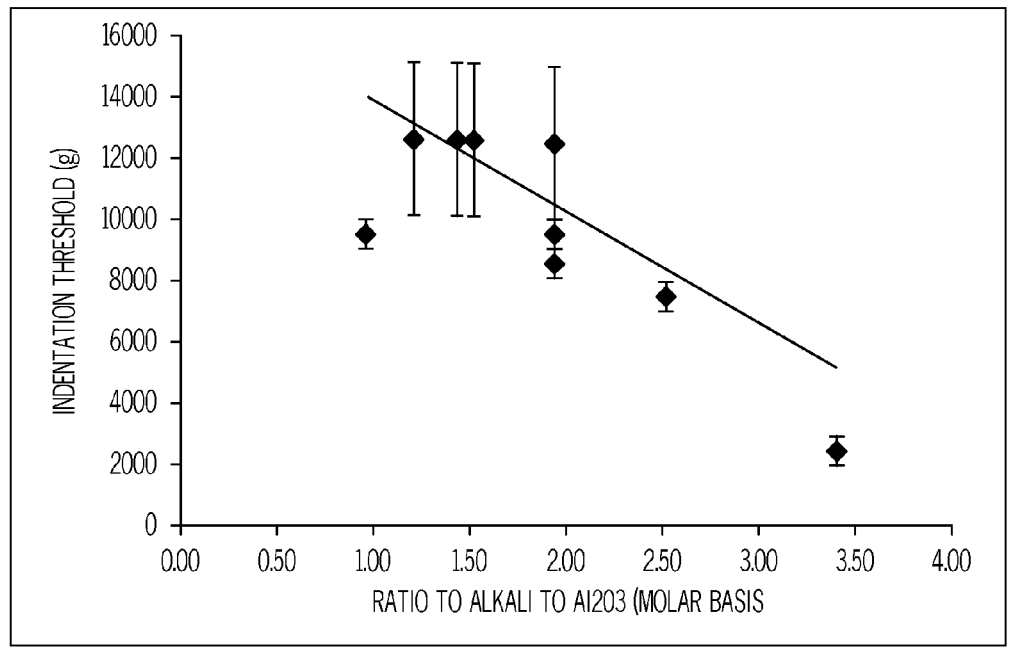
FIG. 10 graphically depicts the Vickers indentation threshold (y-axis) as a function of the ratio of alkali to alumina (Y:X) (x-axis)

However, increasing the Y:X ratio (where Y is the total concentration of alkali oxides and X is the concentration of $Al_2O_3$) generally decreases the Vickers indentation threshold. That is, greater Y:X ratios create non-bridging oxygen which are believed to be responsible for decreasing the Vickers indentation threshold. FIG. 10 graphically depicts the Vickers indentation threshold (y-axis) and the ratio Y:X (x-axis) for examples A-F and P-V demonstrating that the Vickers indentation threshold generally decreases when the ratio Y:X exceeds about 2.

Figure 11:
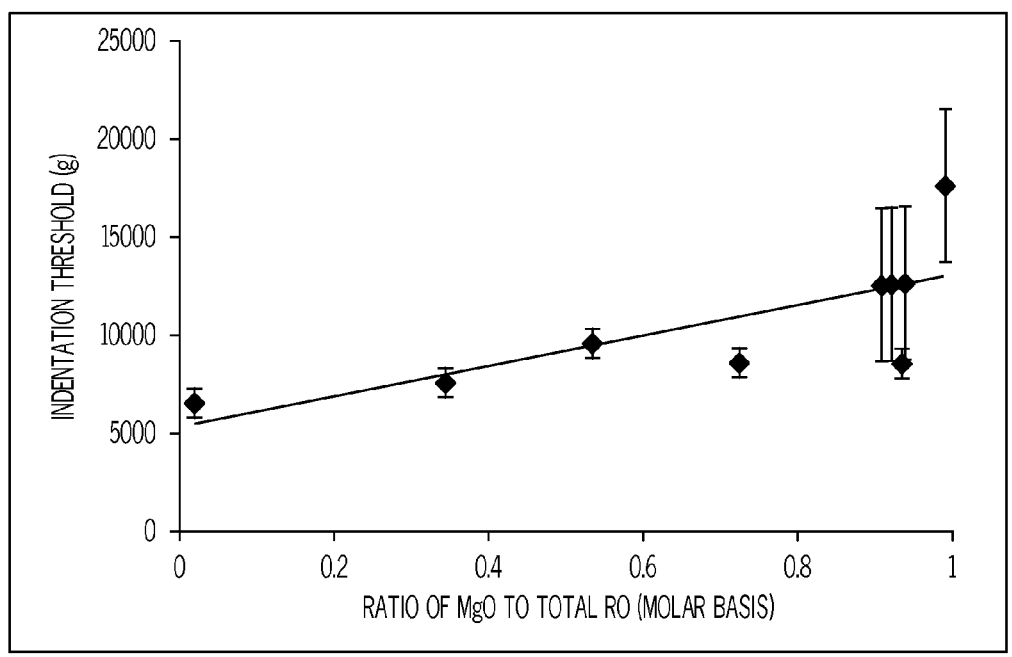
FIG. 11 graphically depicts the Vickers indentation threshold (y-axis) as a function of the ratio of MgO to the total concentration of alkaline earth oxides in the glass composition (x-axis)

The concentration of certain alkaline earth oxide constituents may also effect the Vickers indentation behavior. In particular, it has been found that as the ratio of the concentration of MgO (mol. %) in the glass composition to the sum of the total alkaline earth oxide concentration (mol. %) in the glass increases, the Vickers indentation threshold also increases. FIG. 11 graphically depicts Vickers indentation threshold (y-axis) as a function of the ratio of the concentration of MgO in the glass composition to the total concentration of alkaline earth oxide in the glass composition (x-axis) for examples A-F and P-V, demonstrating that the Vickers indentation threshold general increases as the ratio of the MgO concentration to the total concentration of alkaline earth oxides increases. Further, it is believed that as the ratio of the concentration of MgO (mol. %) in the glass composition to the concentration of CaO in the glass composition increases, the Vickers indentation threshold also increases.

Figure 12:
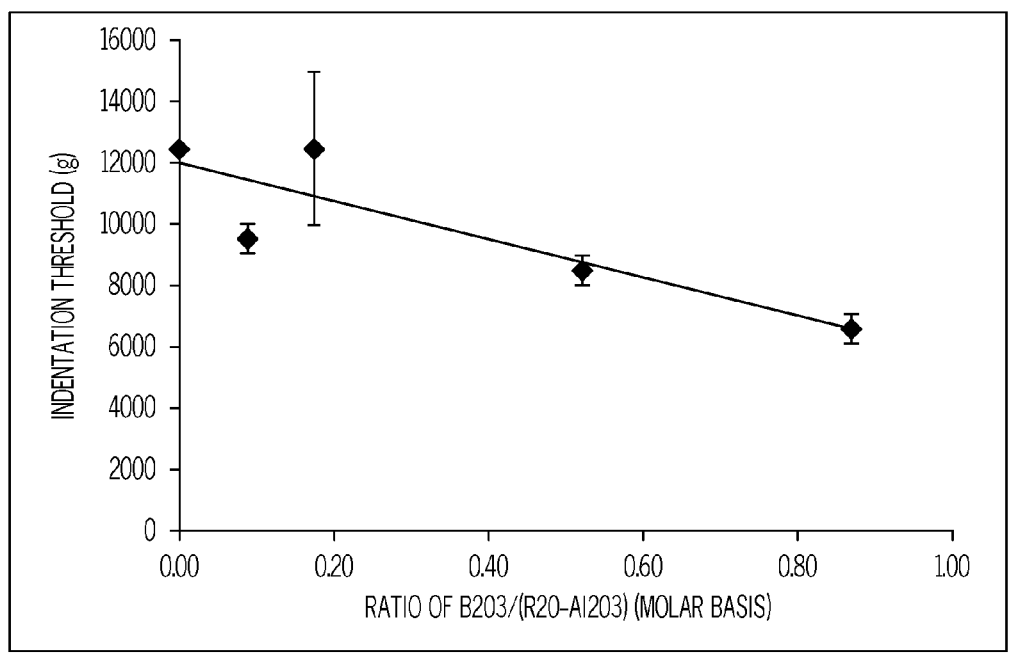
FIG. 12 graphically depicts the Vickers indentation threshold (y-axis) as a function of the ratio of the concentration of $B_2O_3$ to the difference in the total concentration of alkaline earth oxides in the glass composition and the concentration of alumina in the glass composition (x-axis).

The addition of $B_2O_3$ to the glass composition may decrease the Vickers indentation threshold, particularly when the ratio of $B_2O_3$ to the difference between the total concentration of alkali oxides (Y) and the concentration of $Al_2O_3$ (X) (i.e., $B_2O_3$ (mol. %):(Y-X) is high. For example, when the ratio of $B_2O_3/(Y-X)$ is about 1.0, the Vickers indentation threshold is about 7 kg. However, when the ratio of $B_2O_3/(Y-X)$ is reduced to about 0.3, the Vickers indentation threshold is about 10 kg, as is graphically depicted in FIG. 12 graphically depicts Vickers indentation threshold (y-axis) as a function of the ratio of $B_2O_3$ to Y-X (x-axis) for examples V-Y and 10-11, demonstrating that the Vickers indentation threshold general decreases as the ratio of $B_2O_3$ to Y-X increases.

It should now be understood that the glass compositions described herein exhibit chemical durability as well as mechanical durability following ion exchange. These properties make the glass compositions well suited for use in various applications including, without limitation, pharmaceutical packaging materials.

Based on the foregoing, it should now be understood that various aspects of glass compositions and glass articles formed from glass compositions are disclosed. According to a first aspect, a glass composition may include: $SiO_2$ in a concentration greater than about 70 mol. % and Y mol. % alkali oxide. The alkali oxide may include $Na_2O$ in an amount greater than about 8 mol. %. The glass composition may be free of boron and compounds of boron.

In a second aspect, the glass composition of the first aspect includes $SiO_2$ in an amount greater than or equal to about 72 mol. %.

In a third aspect, the glass composition of the first or second aspects is free from phosphorous and compounds of phosphorous.

In a fourth aspect, the glass composition of any of the first through third aspects further includes X mol. % $Al_2O_3$, wherein a ratio of Y:X is greater than 1.

In a fifth aspect, the glass composition of the ratio of Y:X in the fourth aspect is less than or equal to 2.

In a sixth aspect, the glass composition of the amount of $Al_2O_3$ in the fourth or fifth aspects is greater than or equal to about 2 mol. % and less than or equal to about 10 mol. %.

In a seventh aspect, the glass composition of any of the first through fifth aspects further includes from about 3 mol. % to about 13 mol. % alkaline earth oxide.

In an eighth aspect, the alkaline earth oxide of the seventh aspect includes MgO and CaO, the CaO is present in an amount greater than or equal to about 0.1 mol. % and less than or equal to about 1.0 mol. %, and a ratio (CaO (mol. %)/(CaO (mol. %)+MgO (mol. %))) is less than or equal to 0.5.

In a ninth aspect, a glass composition may include greater than about 68 mol. % $SiO_2$; X mol. % $Al_2O_3$ and Y mol. % alkali oxide; and $B_2O_3$. The alkali oxide may include $Na_2O$ in an amount greater than about 8 mol %. A ratio ($B_2O_3$ (mol. %)/(Y mol. %-X mol. %) may be greater than 0 and less than 0.3.

In a tenth aspect, the glass composition of the ninth aspect includes $SiO_2$ in an amount greater than or equal to about 72 mol. %.

In an eleventh aspect, the glass composition of the ninth aspect or the tenth aspect includes $B_2O_3$ in an amount greater than or equal to about 0.01 mol. % and less than or equal to about 4 mol. %.

In a twelfth aspect, the glass composition of any of the ninth through eleventh aspects, wherein the glass composition has a ratio of Y:X is greater than 1.

In a thirteenth aspect, the ratio of Y:X of the twelfth aspect is less than or equal to 2.

A fourteenth aspect includes the glass composition of any of the ninth through thirteenth aspects wherein X is greater than or equal to about 2 mol. % and less than or equal to about 10 mol. %.

A fifteenth aspect includes the glass composition of any of the ninth through fourteenth aspects wherein the glass composition is free from phosphorous and compounds of phosphorous.

A sixteenth aspect includes the glass composition of any of the ninth through fifteenth aspects, wherein the glass composition further comprises MgO and CaO, the CaO is present in an amount greater than or equal to about 0.1 mol. % and less than or equal to about 1.0 mol. %, and a ratio (CaO (mol. %)/(CaO (mol. %)+MgO (mol. %))) is less than or equal to 0.5.

In a seventeenth aspect, a glass article may have a type HGB1 hydrolytic resistance according to ISO 719. The glass article may include greater than about 8 mol. % $Na_2O$ and less than about 4 mol. % $B_2O_3$.

In an eighteenth aspect, the glass article of the seventeenth aspect further comprises X mol. % $Al_2O_3$ and Y mol. % alkali oxide, wherein a ratio ($B_2O_3$ (mol. %)/(Y mol. %-X mol. %) is greater than 0 and less than 0.3.

In a nineteenth aspect, the glass article of any of the seventeenth through eighteenth aspects further comprises a compressive stress layer having a surface compressive stress greater than or equal to about 250 MPa.

A twentieth aspect includes the glass article of any of the seventeenth through nineteenth aspects, wherein the glass article has at least a class S3 acid resistance according to DIN 12116.

A twenty-first aspect includes the glass article of any of the seventeenth through twentieth aspect in which the glass article has at least a class A2 base resistance according to ISO 695.

A twenty-second aspect includes the glass article of any of the seventeenth through twenty-first aspects wherein the glass article has a type HGA1 hydrolytic resistance according to ISO 720.

In a twenty-third aspect, a glass pharmaceutical package may include: $SiO_2$ in an amount greater than about 70 mol. %; X mol. % $Al_2O_3$; and Y mol. % alkali oxide. The alkali oxide may include $Na_2O$ in an amount greater than about 8 mol. %. A ratio of a concentration of $B_2O_3$ (mol. %) in the glass pharmaceutical package to (Y mol. %-X mol. %) may be less than 0.3. The glass pharmaceutical package may also have a type HGB1 hydrolytic resistance according to ISO 719.

A twenty-fourth aspect includes the glass pharmaceutical package of the twenty-third aspect wherein the amount of $SiO_2$ is greater than or equal to 72 mol. % and less than or equal to about 78 mol. %.

A twenty-fifth aspect includes the glass pharmaceutical package of the twenty-third through twenty-fourth aspects wherein X is greater than or equal to about 4 mol. % and less than or equal to about 8 mol. %.

A twenty-sixth aspect includes the glass pharmaceutical package of the twenty-third through twenty-fifth aspects wherein a ratio of Y:X is greater than 1.

A twenty-seventh aspect includes the glass pharmaceutical package of the twenty-third through twenty-sixth aspects, wherein a ratio of Y:X is less than 2.

A twenty-eighth aspect includes the glass pharmaceutical package of the twenty-third through twenty-seventh aspects which further comprises from about 4 mol. % to about 8 mol. % alkaline earth oxide.

A twenty-ninth aspect includes the glass pharmaceutical package of the twenty-third through twenty-eighth aspects which the further comprises MgO and CaO, CaO is present in an amount greater than or equal to about 0.2 mol. % and less than or equal to about 0.7 mol. % and a ratio (CaO (mol. %)/(CaO (mol. %)+MgO (mol. %))) is less than or equal to 0.5.

A thirtieth aspect includes the glass pharmaceutical package of the twenty-third through twenty-ninth aspects, wherein the pharmaceutical package has a type HGA1 hydrolytic resistance according to ISO 720.

In a thirty-first aspect, a glass composition may include from about 70 mol. % to about 80 mol. % $SiO_2$; from about 3 mol. % to about 13 mol. % alkaline earth oxide; X mol. % $Al_2O_3$; and Y mol. % alkali oxide. The alkali oxide may include $Na_2O$ in an amount greater than about 8 mol. %. A ratio of Y:X may be greater than 1 and the glass composition may be free of boron and compounds of boron.

In a thirty-second aspect, a glass composition may include: from about 72 mol. % to about 78 mol. % $SiO_2$; from about 4 mol. % to about 8 mol. % alkaline earth oxide; X mol. % $Al_2O_3$; and Y mol. % alkali oxide. The amount of alkaline earth oxide may be greater than or equal to about 4 mol. % and less than or equal to about 8 mol. %. The alkali oxide may include $Na_2O$ in an amount greater than or equal to about 9 mol. % and less than or equal to about 15 mol. %. A ratio of Y:X may be greater than 1. The glass composition may be free of boron and compounds of boron.

In a thirty-third aspect, a glass composition may include: from about 68 mol. % to about 80 mol. % $SiO_2$; from about 3 mol. % to about 13 mol. % alkaline earth oxide; X mol. % $Al_2O_3$; and Y mol. % alkali oxide. The alkali oxide may include $Na_2O$ in an amount greater than about 8 mol. %. The glass composition may also include $B_2O_3$. A ratio ($B_2O_3$ (mol. %)/(Y mol. %-X mol. %) may be greater than 0 and less than about 0.3, and a ratio of Y:X may be greater than 1.

In a thirty-fourth aspect, a glass composition may include from about 70 mol. % to about 80 mol. % $SiO_2$; from about 3 mol. % to about 13 mol. % alkaline earth oxide; X mol. % $Al_2O_3$; and Y mol. % alkali oxide. The alkaline earth oxide may include CaO in an amount greater than or equal to about 0.1 mol. % and less than or equal to about 1.0 mol. %. X may be greater than or equal to about 2 mol. % and less than or equal to about 10 mol. %. The alkali oxide may include from about 0.01 mol. % to about 1.0 mol. % $K_2O$. A ratio of Y:X may be greater than 1. The glass composition may be free of boron and compounds of boron.

In a thirty-fifth aspect, a glass composition may include $SiO_2$ in an amount greater than about 70 mol. % and less than or equal to about 80 mol. %; from about 3 mol. % to about 13 mol. % alkaline earth oxide; X mol. % $Al_2O_3$; and Y mol. % alkali oxide. The alkali oxide may include $Na_2O$ in an amount greater than about 8 mol. %. A ratio of a concentration of $B_2O_3$ (mol. %) in the glass composition to (Y mol. %-X mol. %) may be less than 0.3. A ratio of Y:X may be greater than 1.

In a thirty-sixth aspect, the glass composition of any of the thirty-first through thirty-fifth aspects wherein the $SiO_2$ is present in an amount less than or equal to 78 mol. %.

A thirty-seventh aspect includes the glass composition of any of thirty-first through thirty-sixth aspects, wherein an amount of the alkaline earth oxide is greater than or equal to about 4 mol. % and less than or equal to about 8 mol. %.

A thirty-eighth aspect includes the glass composition of any of the thirty-first through thirty-seventh aspects wherein the alkaline earth oxide comprises MgO and CaO and a ratio (CaO (mol. %)/(CaO (mol. %)+MgO (mol. %))) is less than or equal to 0.5.

A thirty-ninth aspect includes the glass composition of any of the thirty-first through thirty eighth aspects, wherein the alkaline earth oxide comprises from about 0.1 mol. % to less than or equal to about 1.0 mol. % CaO.

A fortieth aspect includes, the glass composition of any of the thirty-first through thirty-ninth aspects wherein the alkaline earth oxide comprises from about 3 mol. % to about 7 mol. % MgO.

A forty-first aspect includes the glass composition of any of the thirty-first, thirty-second, or thirty-fourth aspects, wherein X is greater than or equal to about 2 mol. % and less than or equal to about 10 mol. %.

A forty-second aspect includes the glass composition of any of the thirty-first through forty-first aspects, wherein the alkali oxide comprises greater than or equal to about 9 mol. % $Na_2O$ and less than or equal to about 15 mol. % $Na_2O$.

A forty-third aspect includes the glass composition of any of the thirty-first through forty-second aspects, wherein the ratio of Y:X is less than or equal to 2.

A forty-fourth aspect includes the glass composition of any of the thirty-first through forty-third aspects, wherein the ratio of Y:X is greater than or equal to 1.3 and less than or equal to 2.0.

A forty-fifth aspect includes the glass composition of any of the thirty-first through forty-fourth aspects, wherein the alkali oxide further comprises $K_2O$ in an amount less than or equal to about 3 mol. %.

A forty-sixth aspect includes the glass composition of any of the thirty-first through forty-fifth aspects, wherein the glass composition is free of phosphorous and compounds of phosphorous.

A forty-seventh includes the glass composition of any of the thirty-first through forty-sixth aspects, wherein the alkali oxide comprises $K_2O$ in an amount greater than or equal to about 0.01 mol. % and less than or equal to about 1.0 mol. %.

A forty-eighth aspect includes the glass composition of any of the thirty-second or thirty-fourth aspects, wherein an amount of $SiO_2$ is greater than or equal to about 70 mol. %.

A forty-ninth aspect includes the glass composition of any of the thirty-second or thirty-fourth aspects, wherein the ratio ($B_2O_3$ (mol. %)/(Y mol. %-X mol. %) is less than 0.2.

A fiftieth aspect includes the glass composition of any of the thirty-second or thirty-fourth aspects, wherein an amount of $B_2O_3$ is less than or equal to about 4.0 mol. %.

A fifty-first aspect includes the glass composition of the fiftieth aspect, wherein the amount of $B_2O_3$ is greater than or equal to about 0.01 mol. %.

A fifty-second aspect includes the glass composition of the thirty-fourth aspect, wherein the glass composition is free from boron and compounds of boron.

A fifty-third aspect includes the glass composition of any of the thirty-first through thirty-fourth aspects, wherein the concentration of $SiO_2$ is greater than or equal to about 72 mol. %.

A fifty-fourth aspect includes the glass composition of any of the thirty-first through fifty-third aspects, wherein the concentration of $SiO_2$ is greater than or equal to about 73 mol. %.

In a fifty-fifth aspects, a glass article is formed from the glass composition of any of the thirty-first through fifty-fourth aspects.

A fifty-sixth aspect includes the glass article of the fifty-fifth aspect, wherein the glass article has a type HGB1 hydrolytic resistance according to ISO 719.

A fifty-seventh aspect includes the glass article of any of the fifty-fifth through fifty-sixth aspects, wherein the glass article has a type HGA1 hydrolytic resistance according to ISO 720 after ion exchange strengthening.

A fifty-eighth aspect includes the glass article of any of the fifty-fifth through fifty-seventh aspects, wherein the glass article has a type HGA1 hydrolytic resistance according to ISO 720 before and after ion exchange strengthening.

A fifty-ninth aspect includes the glass article of any of the fifty-fifth through fifty-eighth aspects, wherein the glass article has at least a class S3 acid resistance according to DIN 12116.

A sixtieth aspect includes, the glass article of any of the fifty-fifth through fifty-ninth aspects, wherein the glass article has at least a class A2 base resistance according to ISO 695.

A sixty-first aspect includes the glass article of any of the fifty-fifth through sixtieth aspects, wherein the glass article is a pharmaceutical package.

A sixty-second aspect includes the glass article of any of the fifty-fifth through sixty-first aspects, wherein the glass article is ion exchange strengthened.

A sixty-third aspect includes the glass article of any of the fifty-fifth through sixty-second aspects in which the glass article further a compressive stress layer with a depth of layer greater than or equal to 10 μm and a surface compressive stress greater than or equal to 250 MPa.

In a sixty-fourth aspect, a glass article may have a type HGB1 hydrolytic resistance according to ISO 719. The glass article may also have a threshold diffusivity of greater than 16 μm²/hr at a temperature less than or equal to 450° C.

A sixty-fifth aspect includes the glass article of the sixty-fourth aspect wherein the threshold diffusivity is greater than or equal to 20 μm²/hr at a temperature of less than or equal to 450° C.

A sixty-sixth aspect includes the glass article of any of the sixty-third through sixty-fourth aspects wherein the glass article has a type HGA1 hydrolytic resistance according to ISO 720 after ion exchange strengthening.

A sixty-seventh aspect includes the glass article of any of the sixty-fourth through sixty-sixth aspects which further comprises a compressive stress with a depth of layer greater than 25 μm.

A sixty-eighth aspect includes the glass article of the sixty-seventh aspect wherein the depth of layer is greater than 35 μm.

A sixty-ninth aspect includes the glass article of any of the sixty-third through sixty-eighth aspects wherein the glass article is ion exchange strengthened and the ion exchange strengthening comprises treating the glass article in a molten salt bath for a time less than or equal to 5 hours at a temperature less than or equal to 450° C.

A seventieth aspect includes the glass article of any of the sixty-third through sixty-ninth aspects which further comprises a surface compressive stress greater than or equal to 350 MPa.

A seventy-first aspect includes the glass article of any of the sixty-third through seventieth aspects wherein the surface compressive stress is greater than or equal to 400 MPa.

A seventy-second aspect includes the glass article of any of the sixty-third through seventy-first aspects, wherein the glass article is ion exchange strengthened and the ion exchange strengthening comprises treating the glass article in a molten salt bath for a time less than or equal to 5 hours at a temperature less than or equal to 450° C.

A seventy-second aspect includes the glass article of any of the sixty-third through seventy-second aspects, wherein the glass article is a pharmaceutical package.

In a seventy-third aspect, a glass article may have a type HGB1 hydrolytic resistance according to ISO 719. The glass article may also have a compressive stress layer with a depth of layer of greater than 25 μm and a surface compressive stress of greater than or equal to 350 MPa. The glass article may be ion exchange strengthened and the ion exchange strengthening may include treating the glass article in a molten salt bath for a time less than or equal to 5 hours at a temperature less than or equal to 450° C.

A seventy-fourth aspect includes, the glass article of the seventy-third aspect, wherein the glass article has a type HGA1 hydrolytic resistance according to ISO 720 after ion exchange strengthening.

A seventy-fifth aspect includes the glass article of any of the seventy-third through seventy-fourth aspects, wherein the glass article has a threshold diffusivity of greater than 16 μm²/hr at a temperature of less than or equal to 450° C.

A seventy-sixth aspect includes the glass article of any of the seventy-third through seventy-fifth aspects, wherein the threshold diffusivity is greater than or equal to 20 μm²/hr at a temperature of less than or equal to 450° C.

A seventy-seventh aspect includes the glass article of any of the seventy-third through seventy-sixth aspects, wherein the glass article is a pharmaceutical package.

A seventy-eighth aspect includes any of the first through seventy-seventh aspects, wherein the glass has a Vickers crack initiation threshold is greater than or equal to about 7 kgf.

A seventh-ninth aspect includes any of the first through seventy-eighth aspects, wherein the glass has a Vickers crack initiation threshold is less than or equal to about 30 kgf.

An eightieth aspect includes the glass articles of any of the first through seventy-ninth aspects, wherein the glass has a Vickers crack initiation threshold is greater than or equal to about 10 kgf and less than or equal to about 20 kgf.

In an eighty-first aspect, a glass article may be formed from a glass composition which may include: $SiO_2$ in an amount greater than about 70 mol. % and less than or equal to about 80 mol. %; from about 3 mol. % to about 13 mol. % alkaline earth oxide, the alkaline earth oxide comprising CaO; X mol. % $Al_2O_3$; and Y mol. % alkali oxide, wherein the alkali oxide comprises $Na_2O$ in an amount greater than or equal to about 9 mol. % and less than or equal to about 13 mol. %. The ratio of a concentration of $B_2O_3$ (mol. %) in the glass composition to (Y mol. %-X mol. %) may be less than 0.3. A ratio of Y:X in the glass composition may be greater than 1 and less than or equal to 2. The glass article may have a compressive stress layer extending from a surface of the glass article to a depth of greater than or equal to about 10 microns with a surface compressive stress of greater than or equal to about 250 MPa. The glass article may have a Vickers crack initiation threshold of at least about 7 kgf.

In an eighty-second aspect, a glass article may be formed from a glass composition which may include from about 70 mol. % to about 80 mol. % $SiO_2$; from about 4 mol. % to about 8 mol. % alkaline earth oxide, the alkaline earth oxide comprising CaO; X mol. % $Al_2O_3$, wherein X is greater than or equal to about 5 and less than or equal to about 7; and Y mol. % alkali oxide, wherein the alkali oxide comprises $Na_2O$ in an amount greater than about 8 mol. %, and the glass composition is free of boron and compounds of boron. The glass article may have a compressive stress layer extending from a surface of the glass article to a depth of greater than or equal to about 10 microns with a surface compressive stress of greater than or equal to about 250 MPa. The glass article may also have a Vickers crack initiation threshold of at least about 7 kgf.

In an eighty-third aspect, a glass article may be formed from a glass composition which may include greater than or equal to about 68 mol. % $SiO_2$ and less than or equal to about 80 mol. % $SiO_2$; greater than or equal to about 3 mol. % and less than or equal to about 13 mol. % alkaline earth oxide; X mol. % $Al_2O_3$, wherein X is greater than or equal to about 4 and less than or equal to about 8; Y mol. % alkali oxide, wherein the alkali oxide comprises $Na_2O$ in an amount greater than about 8 mol %; and $B_2O_3$, wherein a ratio ($B_2O_3$ (mol. %)/(Y mol. %-X mol. %) is greater than 0 and less than 0.3. The glass article may have a compressive stress layer extending from a surface of the glass article to a depth of greater than or equal to about 10 microns with a surface compressive stress of greater than or equal to about 250 MPa. The glass article has a Vickers crack initiation threshold of at least about 7 kgf.

An eighty-fourth aspect includes the glass articles of any of the eighty-first through eighty-third aspects, wherein the Vickers crack initiation threshold is less than or equal to about 30 kgf.

An eighty-fifth aspect includes the glass articles of any of the eighty-first through eighty-third aspects, wherein the Vickers crack initiation threshold is greater than or equal to about 10 kgf and less than or equal to about 20 kgf.

An eighty-sixth aspect includes the glass articles of any of the eighty-second through eighty-fifth aspects, wherein a ratio of Y:X is greater than 1 and less than or equal to 2.

An eighty-seventh aspect includes the glass article of the eighty-sixth aspect, wherein a ratio of Y:X is greater than or equal to about 1.3 and less than or equal to about 2.0.

An eighty-eighth aspect includes the glass articles of any of the eighty-first through eighty-seventh aspects, wherein the glass article has a type HGB1 hydrolytic resistance according to ISO 719.

A eighty-ninth aspect includes the glass articles of any of the eighty-first through eighty-eighth aspects, wherein the glass article has a type HGA1 hydrolytic resistance according to ISO 720.

A ninetieth aspect includes the glass articles of any of the eighty-first through eighty-ninth aspects, wherein the glass article has at least a class S3 acid resistance according to DIN 12116.

A ninety-first aspect includes the glass articles of any of the eighty-first through ninetieth aspects, wherein the glass article has at least a class A2 base resistance according to ISO 695.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass article formed from a glass composition comprising:
    $SiO_2$ in an amount greater than 70 mol. % and less than or equal to 80 mol. %;
    from 4 mol. % to 8 mol. % alkaline earth oxide, the alkaline earth oxide comprising CaO;
    X mol. % $Al_2O_3$; and
    Y mol. % alkali oxide, wherein the alkali oxide comprises $Na_2O$ in an amount greater than or equal to 9 mol. % and less than or equal to 13 mol. %, wherein:
        a ratio of a concentration of $B_2O_3$ (mol. %) in the glass composition to (Y mol. %-X mol. %) is less than 0.3;
        a ratio of Y:X is greater than 1 and less than or equal to 2;
        the glass article has a compressive stress layer extending from a surface of the glass article to a depth of greater than or equal to 10 microns, the compressive stress layer having a surface compressive stress of greater than or equal to 250 MPa; and
        the glass article has a Vickers crack initiation threshold of at least 7 kgf.

2. The glass article of claim 1, wherein the Vickers crack initiation threshold is less than or equal to 30 kgf.

3. The glass article of claim 1, wherein the Vickers crack initiation threshold is greater than or equal to 10 kgf and less than or equal to 20 kgf.

4. The glass article of claim 1, wherein a ratio of Y:X is greater than or equal to 1.3 and less than or equal to 2.0.

5. The glass article of claim 1, wherein the glass article has a type HGB1 hydrolytic resistance according to ISO 719.

6. The glass article of claim 1, wherein the glass article has a type HGA1 hydrolytic resistance according to ISO 720.

7. The glass article of claim 1, wherein the glass article has at least a class S3 acid resistance according to DIN 12116.

8. The glass article of claim 1, wherein the glass article has at least a class A2 base resistance according to ISO 695.

9. A glass article formed from a glass composition comprising:
    from 70 mol. % to 80 mol. % $SiO_2$;
    from 4 mol. % to 8 mol. % alkaline earth oxide, the alkaline earth oxide comprising CaO;
    X mol. % $Al_2O_3$, wherein X is greater than or equal to 5 and less than or equal to 7; and
    Y mol. % alkali oxide, wherein the alkali oxide comprises $Na_2O$ in an amount greater than or equal to 9 mol. % and less than or equal to 13 mol. %, and the glass composition is free of boron and compounds of boron, wherein:
        the glass article has a compressive stress layer extending from a surface of the glass article to a depth of greater than or equal to 10 microns, the compressive stress layer having a surface compressive stress of greater than or equal to 250 MPa; and
        the glass article has a Vickers crack initiation threshold of at least 7 kgf.

10. The glass article of claim 9, wherein the Vickers crack initiation threshold is less than or equal to 30 kgf.

11. The glass article of claim 9, wherein the Vickers crack initiation threshold is greater than or equal to 10 kgf and less than or equal to 20 kgf.

12. The glass article of claim 9, wherein a ratio of Y:X is greater than 1.

13. The glass article of claim 12, wherein a ratio of Y:X is less than or equal to 2.

14. The glass article of claim 9, wherein a ratio of Y:X is greater than or equal to 1.3 and less than or equal to 2.0.

15. The glass article of claim 9, wherein the glass article has a type HGB1 hydrolytic resistance according to ISO 719.

16. The glass article of claim 9, wherein the glass article has a type HGA1 hydrolytic resistance according to ISO 720.

17. The glass article of claim 9, wherein the glass article has at least a class S3 acid resistance according to DIN 12116.

18. The glass article of claim 9, wherein the glass article has at least a class A2 base resistance according to ISO 695.

19. The glass article of claim 9 comprising from 72 mol. % to 78 mol. % $SiO_2$.

* * * * *